(12) United States Patent
Hawkins et al.

(10) Patent No.: US 10,213,973 B2
(45) Date of Patent: Feb. 26, 2019

(54) COMPOSITE RAIL TIE APPARATUS AND METHOD

(71) Applicants: Michael A. Hawkins, Lehi, UT (US); Michael L. Hawkins, Highland, UT (US)

(72) Inventors: Michael A. Hawkins, Lehi, UT (US); Michael L. Hawkins, Highland, UT (US)

( * ) Notice: Subject to any disclaimer, the term of this patent is extended or adjusted under 35 U.S.C. 154(b) by 542 days.

(21) Appl. No.: 15/003,628

(22) Filed: Jan. 21, 2016

(65) Prior Publication Data

US 2016/0251807 A1    Sep. 1, 2016

Related U.S. Application Data

(60) Provisional application No. 62/237,941, filed on Oct. 6, 2015, provisional application No. 62/197,412, filed
(Continued)

(51) Int. Cl.
*B29C 70/52*    (2006.01)
*B29C 70/74*    (2006.01)
(Continued)

(52) U.S. Cl.
CPC ............ *B29C 70/52* (2013.01); *B29C 70/745* (2013.01); *E01B 3/46* (2013.01); *F16B 7/00* (2013.01);
(Continued)

(58) Field of Classification Search
CPC ..... E01B 3/00; E01B 3/02; E01B 3/10; E01B 3/12; E01B 3/16; E01B 3/18; E01B 3/28; E01B 3/32; E01B 3/46
See application file for complete search history.

(56) References Cited

U.S. PATENT DOCUMENTS 5,658,519 A    8/1997 March et al.
6,081,955 A    7/2000 Dumlao et al.
(Continued)

FOREIGN PATENT DOCUMENTS

EP    0745201 B1    3/1999
WO   WO 95/02496    1/1995

OTHER PUBLICATIONS

American Chemistry Council, Center for the Polyurethane Industry, Polyurethane Amine Catalysts: Safe Handling Guidelines, Issue AX173, pp. 1-19, 2011.
(Continued)

*Primary Examiner* — Robert J McCarry, Jr.
(74) *Attorney, Agent, or Firm* — Pate Baird, PLLC

(57) ABSTRACT

A railroad crosstie (tie) may be fabricated from a composite material including a fiber reinforced polymer shell manufactured by pultrusion or other process, and filled by a suitable material, typically selected from expanded elastomeric polymer (such as polyurethane resin or other polymer), concrete, lightweight concrete formed by conventional aggregate, sand, cement, water, and an ultra light filler such as natural materials, sawdust, beads of expanded polymer such as expanded polystyrene, microspheres of glass or plastic, a recycled wooden tie in conjunction with any of the above, or the like. Fasteners may be driven such as spikes, threaded, such as screws, lag screws, spreading screws, rivets, or the like into apertures, pilot holes, or directly into fill absent apertures therein.

17 Claims, 25 Drawing Sheets

Related U.S. Application Data on Jul. 27, 2015, provisional application No. 62/106,540, filed on Jan. 22, 2015.

(51) Int. Cl.
*F16B 7/00* (2006.01)
*E01B 3/46* (2006.01)
*B29C 70/54* (2006.01)
*B29L 31/06* (2006.01)
*B29L 31/10* (2006.01)

(52) U.S. Cl.
CPC ......... *B29C 70/545* (2013.01); *B29L 2031/06* (2013.01); *B29L 2031/10* (2013.01)

(56) References Cited

U.S. PATENT DOCUMENTS

| | | |
|---|---|---|
| 6,367,226 B1 | 4/2002 | Shauf, Sr. et al. |
| 6,659,362 B1 * | 12/2003 | Hallissy .................. E01B 3/10 238/35 |
| 6,766,963 B2 | 7/2004 | Hansen |
| 6,821,623 B2 | 11/2004 | Kvesic |
| 7,866,569 B2 | 1/2011 | Cadwell |
| 8,322,105 B2 | 12/2012 | Williams |
| 8,359,814 B2 | 1/2013 | Williams |
| 2013/0008096 A1 | 1/2013 | Griffiths et al. |

OTHER PUBLICATIONS

3M Energy and Advanced Materials Division, 3M Glass Bubbles S60HS, online catalog page, Jan. 2008.

* cited by examiner

| 220 | | | CFM (212a) | NCF (214a) | Hybrid (216a) |
|---|---|---|---|---|---|
| Uni-directional moduli (220a) | E1 (msi) | | 1.66 | 2.91 | 2.28 |
| | E2 (msi) | | | | |
| | E3 (msi) | | 2.4 | | |
| Poisson's ratios (220b) | v12 | | 0.3 | | |
| | v13 | | | | |
| | v23 | | | | |
| Shear moduli (220c) | G12 (msi) | | 0.63 | 1.15 | 0.89 |
| | G13 (msi) | | | | |
| | G23 (msi) | | | | |

*FIG. 20*

| 220 | | CFM (212a) | NCF (214a) | Hybrid (216a) |
|---|---|---|---|---|
| X (ksi) | Longitudinal tensile strength | 25 | 55 | 40 |
| X' (ksi) | Longitudinal compressive strength | | | |
| Y (ksi) | Transverse tensile strength | | | |
| Y' (ksi) | Transverse compressive strength | | | |
| Z (ksi) | Through-thickness tensile strength | 5 | | |
| Z' (ksi) | Through-thickness compressive strength | | | |
| S12 (ksi) | In-plane shear strength | 18 | 22 | 20 |
| S13 (ksi) | Transverse shear strength (plane 1-3) | 11 | 11 | 11 |
| S23 (ksi) | Transverse shear strength (plane 2-3) | | | |

*FIG. 21*

|  | PUR foam density (pcf) | | | | | |
|---|---|---|---|---|---|---|
|  | 6 | 10 | 15 | 20 | 25 | 45 |
| Ec (psi) | 2225 | 8340 | 17769 | 30843 | 47307 | 170000 |
| σt (psi) | 138 | 303 | 538 | 818 | 1133 | 2039 |
| σc (psi) | 77 | 337 | 732 | 1282 | 1968 | 3542 |
| Gs (psi) | 1251 | 2823 | 5988 | 9946 | 1440 | 2592 |
| Ts (psi) | 104 | 239 | 453 | 705 | 988 | 1778 |

FIG. 22

COMPOSITE RAIL TIE APPARATUS AND METHOD

RELATED APPLICATIONS

This application claims the benefit of: U.S. Provisional Patent Application Ser. No. 62/106,540, filed Jan. 22, 2015; U.S. Provisional Patent Application Ser. No. 62/197,412, filed Jul. 27, 2015; and U.S. Provisional Patent Application Ser. No. 62/237,941, filed Oct. 6, 2015; all of which are incorporated herein by reference in their entirety.

BACKGROUND

1. Field of the Invention

This invention relates to railroad crossties and, more particularly, to novel systems and methods for construction thereof from composite structural materials.

2. Background Art

Railroad crossties, sometimes called rail ties or simply ties, have traditionally been constructed of wood. Wood provides a structural platform sitting on top of road ballast, rock of specified size distribution. The crosstie provides sufficient "flotation" (load pressure distribution) to support the substantial weight of the axles of a railroad train passing over the top thereof. Each rail is secured near one end of each crosstie in order to provide support for a train.

In traditional embodiments, rail ties have been cut from or formed of various wood products, including hardwoods such as oak, as well as softer woods such as pine or spruce. Typically, rail ties have been treated with creosote, a thick, oily liquid that is highly viscous and is typically soaked into the rail ties as an insecticide or pesticide to prevent or resist rotting of the wood.

Over time, the spikes that have secured plates to the ties, may eventually begin to loosen. As wood weathers, splits, shrinks, and the like, the spikes may loosen. Accordingly, the base plate underneath each rail, on top of a tie, as well as the securement plates that attach over the top of the base of the rail, may work loose and fail to provide adequate securement.

In due course, railroad ties are typically removed and replaced by road crews working along the railroad tracks.

In more recent years, various proposals have succeeded in converting some railroad ties to composite materials, such as fiberglass and the like. Similarly, proposals for rubber rail ties have been made. Concrete ties are used in various mass transit rail systems, but appear to be more common in light rail systems, rather than in the heavy or freight rail systems.

Meanwhile, recycling of the rubber from tires has become a major storage and remanufacturing issue. To this end, recycled crumb rubber (RCR) has been developed. Recycled crumb rubber is made up of the ground up rubber material from tires, usually absent the fibrous cord materials, such as nylon and rayon, or other polymer cords, and substantially devoid of any of the metals that previously formed the bead and the radial bands of seal reinforced tires.

It would be an advance in the art to provide a suitable composite tie having suitable protection against weather, suitable strength, selectable weight or density, suitable strength, and reproducible manufacturing.

It would also be an advance in the art to provide a process and product that may be manufactured by mass production techniques, using combinations of polymers, reinforcement within a polymer matrix, suitable fill materials having densities and strengths necessary and suitable for resisting buckling of a fiber reinforced shell, supporting loads within the shell of a tie, and providing suitable weight, as well as anchoring for fasteners securing rails thereto.

It would also be an advance in the art to provide a tie that performs suitably in service to resist any tendency toward moving with respect to ballast, that is, for example, providing a suitable degree of lateral ballast resistance against lateral motion of the railroad on the underlying ballast.

BRIEF SUMMARY OF THE INVENTION

In view of the foregoing, in accordance with the invention as embodied and broadly described herein, a method and apparatus are disclosed as including a process method, equipment, and product for making and using railroad ties formed by pultrusion or other molding processes as fiber-reinforced, polymeric, composite materials. In selected embodiments, the processes and devices may produce an outer shell formed of fiber-reinforced polymer engineered to have the proper strength, stiffness, modulus of elasticity, modulus of rupture, and other mechanical properties necessary to serve as a rail tie.

A fill material may be selected from concrete, lightweight concrete, expanded polymer, expanded elastomer (elastomeric polymer), or the like. Any fill may, in turn, include an "inner fill" or "bulking agent" such as air, glass beads (hollow spheres), polymer bubbles or spheres, to bulk it up while reducing cost and density or total weight. These may include also sawdust, recycled wood, recycled wooden rail ties, or the like Meanwhile, the axial cross-section of a tie may be designed to provide the proper mechanical properties to support a railroad rail passing over a tie. These include supporting the load, resisting chafing, securing the rail to the tie, resisting deflection, resisting buckling, retaining a spike or other fastener, and resisting weather, wear, and the other environmental exposure expected for a rail tie.

The fiber reinforcement may typically be glass, but may be formed of another polymer. However, glass is typically a cost effective solution to fiber reinforcement, having comparatively lower costs and comparatively higher strength and stiffness than other candidate fibers. Meanwhile, the fiber reinforcement may be configured as continuous filament mats (e.g., non-woven) or a woven mat or layup of multiple directions of fibers accessing each of the principal stress directions of zero degrees, 90 degrees, and positive and negative 45 degrees with respect to zero.

In certain embodiments, a pultrusion system may provide guides to assist in directing fiber reinforcement rovings as strands, CFM mats, or oriented fiber fabrics such as quadraxial non-crimp fabric, into a molding system that embeds the fiber reinforcement into a polymer matrix and the polymer matrix may be a thermoplastic, but may be well suited to various thermoset, including epoxies, polyesters, and so forth.

Post processing may include curing, cooling, heating, and the like. Typically, a pultrusion system will rely on rollers to grip the solidified, cured product and dry it continuously from the pultrusion system.

Ties may be cut to length after manufacture as a continuous beam, typically at a length of about 102 inches in accordance with conventional railroad tie sizing. Meanwhile, the lateral and transverse dimensions are typically nine inches and seven inches, respectively, where lateral is a horizontal direction orthogonal to the axial length of a tie, and the transvers direction is the vertical, orthogonal direction with respect to the horizontal, axial direction of the tie in service.

Typically, fastener systems may be of configurations, sizes, types, and materials best adapted to the fill material in the tie. Fill materials may be drilled, piloted, or otherwise provided with an aperture sized to receive a fastener. Apertures may be formed to provide an interference between the outer dimensions thereof, and may be of any suitable shape, although a round hole is easiest to drill by rotary motion.

Meanwhile, fasteners may be driven such as spikes, wherein frictional forces secure the fastener within the fill of a tie. Likewise, fasteners may be threaded, barbed, or otherwise designed to provide pullout strength and securement of a rail to the tie. In certain embodiments, an aperture drilled in the fill, and necessarily passing through the outer shell of a tie, may be made oversized such that no interference exists with a fastener, in order to be later back filled with a suitable material for bonding and binding to the fill, in order to provide adequate purchase (grip, holding power) of a fastener with respect to the fill. Thus, a comparatively lighter density of fill may be used, with a comparatively higher density of backfill into an aperture or cavity formed near (e.g. surrounding) a fastener penetrated into the tie, and particularly into the fill thereof after having passed through the shell.

Various configurations of apertures may include recesses, relief, countersinks, and so forth. Lag systems may be included wherein a compression sleeve is fitted into an aperture in the tie, after which a threaded fastener, such as a lag screw is threaded into the lag sleeve, thus swelling the lag sleeve and forcing it into a compression fit within the fill.

Fasteners may include self tapping screws, bolts, lag screws, rivets, blind rivets, meaning fastener having a main shank that is segmented along axial lines and perforated through its length. A passage along a center axis receives a swage driven into the fastener after the fastener is in place for use. Thus, the fastener is inserted by whatever mechanism desired, whether hammered, driven axially, threaded in, or the like after which a swage element is driven down the central passage. The swage separates out the multiple segments of the shank, spreading them apart and rendering the fastener effectively a rivet in practice. This particular mechanism is particularly appropriate for a composite tie in accordance with the invention, because it then allows the fiber reinforced polymeric shell to act as part of the mechanism of securement against pullout or relaxation of load.

Meanwhile, a spreadable, rivet-like fastener may be driven, placed without resistance, or threaded into an aperture before being swaged out. Analyses of various designs, materials, fill densities, and so forth have been conducted and indicate a rail tie system in accordance with the invention as described hereinbelow appears to have the suitable mechanical properties for satisfactory service as a railroad tie.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 20 is a table illustrating the stiffness properties of the shell portion of the tie as analyzed;

FIG. 21 is a table illustrating the strength properties of the shell;

FIG. 22 is a table illustrating the stiffness and strength properties of the expanded polyurethane or polyurethane resin (PUR) foam at various densities;

DETAILED DESCRIPTION OF THE PREFERRED EMBODIMENTS

Figure 1:
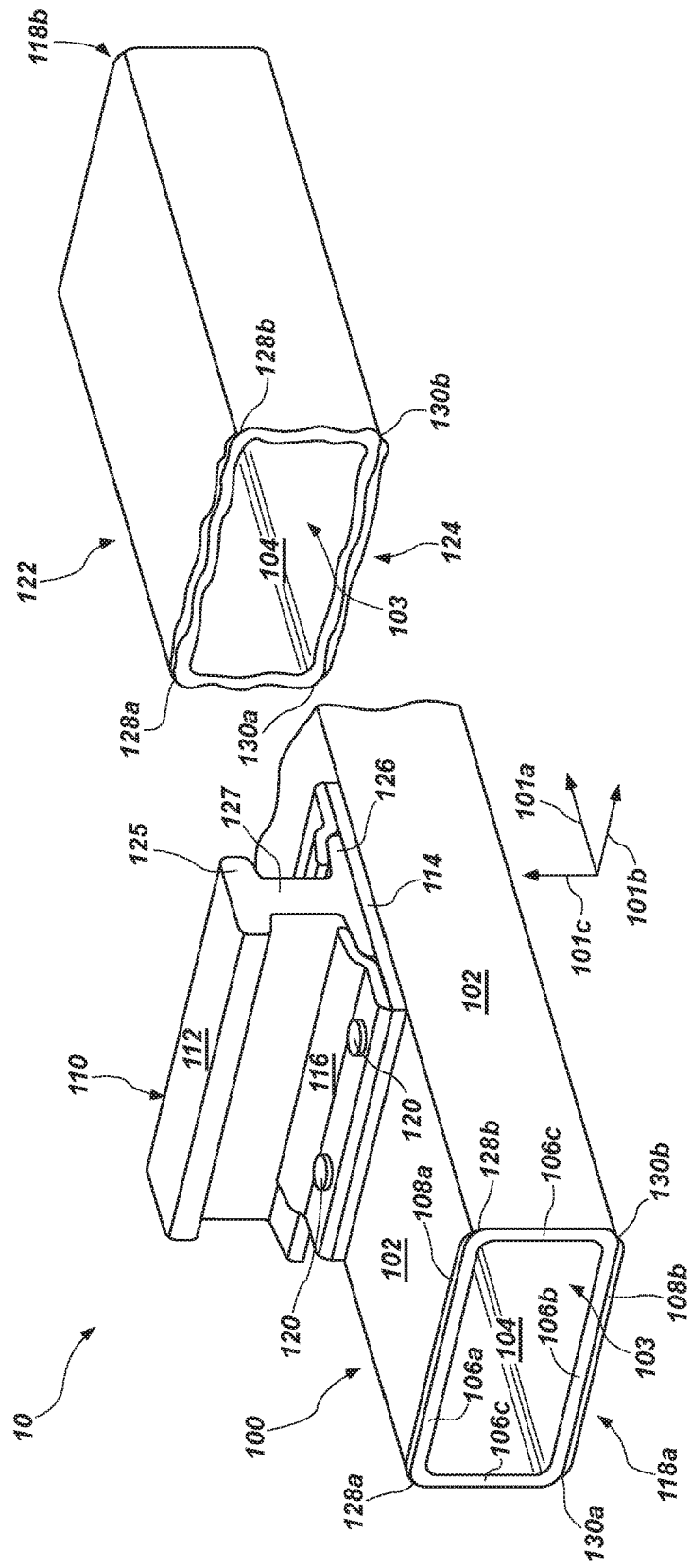
FIG. 1 is a perspective view of one embodiment of a rail system partially cut away, implementing a tie in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a system 10 in accordance with the invention may implement a composite construction for a rail tie 100. In the illustrated embodiment, a tie 100 may be of a conventional size in order to meet replacement needs (retro fit) in systems already using conventional ties. Conventional ties are typically cut from wood, treated to extend their service life. Typical height from a railroad bed of a ballast rock is about seven inches. Meanwhile, the typical width of a tie is nine inches. Meanwhile, the conventional length of 102 inches is consistent with the width between rails that was established supposedly by the width of a chariot on the roads of ancient Rome. Thus, the tie 100 may have these traditional dimensions.

A tie 100 may be formed of a shell 102 formed of a composite structural material. Typically, the composite material of the shell 102 may be a polymeric matrix of resin such as a polyester resin, epoxy resin, or other thermoset resin. A thermoset resin will be cured by any of several means, including heat. However, the addition of heat after cure will not result in liquefaction of the resin. That is, thermoset resins cure. They may require heat to induce the cure, and may be exothermic (giving off heat, rejecting heat) in the process of curing. Thereafter, they will typically maintain a solid state, even to the point of being completely carbonized in a furnace.

Alternatively, the polymer may be a thermoplastic. Thermoplastics differ from thermosets in that a thermoplastic may be reheated to become liquefied again. One benefit to thermosets over thermoplastics is that thermosets are less vulnerable in service to excessive environmental temperatures.

The shell 102 is typically filled with a fill material 104 or fill 104 formed of a very different constituent, which may also be a composite. In some embodiments, the fill 104 may be concrete. Such concrete materials may be substantially similar to those used for concrete structures in various civil engineering projects. Walls, buildings, sidewalks, and the like use a combination of aggregate, sand, and Portland cement rendered active by the addition of water and mixing.

Meanwhile, various types of concrete may include greater or lesser amounts of sand, greater or lesser amounts of aggregate, greater or lesser amounts of cement, greater or lesser amounts of other additives, and greater or lesser amounts of water and curing agents.

In one embodiment, the fill 104 may be concrete having an engineered fraction of expanded polystyrene. It has been found that particles of expanded polymers, such as polystyrene, will reduce the weight of concrete. It also provides additional toughness against fracture. Point loads, sharp impacts, and the like will often fracture conventional concrete. The addition of other polymeric fillers that introduce not only a polymer but additional entrapped air in the expanded polymer have been found to provide additional toughness and resistance to fracture. Moreover, the addition an expanded polymer, such as expanded polystyrene may permit, or perhaps more clearly enable, the engineered control of density of the overall fill 104 when installed. This enables creation of ties 100 of substantially any desired mass or weight.

In yet another embodiment, recycled crumb rubber has been found to have many properties suitable for application to structural support. In one embodiment, a binding resin may be mixed with recycled crumb rubber (RCR) as a fill 104 inside the shell 102 of a tie 100 in accordance with the invention.

In yet another embodiment, the fill 104 may be an expanded polyurethane resin (PUR). Polyurethane may be manufactured in a multiplicity of grades, providing various degrees of hardness, various degrees of flexibility, various degrees of density, and so forth. Meanwhile, PUR may be configured in a variety of elasticity and strengths. By elasticity of a material is meant the elastic modulus. That is, the elastic modulus defines the behavior of materials that abide by Hooke's law.

Hooke's law is the law of spring constants. It basically states in mathematical form that a force is equal to the spring constant of a material multiplied by the deflection (movement, distortion, bending, etc.) of the spring material. The force acts opposite to the direction opposite to the deflection. Thus, a spring in compression provides a force in the opposite direction from the compression, proportional to the deflection. That constant of proportionality is often referred to as "k" or the spring constant.

One benefit of PUR as a fill 104 is the ability to engineer the mechanical properties such as modulus of elasticity, modulus of rupture, ultimate strength, and so forth. The elastic modulus is related to stress and strain. That is, the elastic modulus is also characterized in a material as the stress (force per unit area) applied to a material, divided by the strain (deflection in length per unit length) undergone by the material being loaded (having a force applied).

In the illustrated embodiment, the shell 102 is composed of walls 106. Herein, a trailing letter following a reference numeral indicates a specific instance of a particular item identified by the reference numeral. Thus, it is proper to speak of a wall 106, generally, of a shell 102. For the sake of describing various material properties and other characteristics, we may identify specific walls such as the upper wall 106a or top wall 106a, the bottom wall 106b, or either of the side walls 106c.

As can be seen, the upper wall 106a (or any wall 106) may be coated with a coating 108. Likewise, the bottom wall 106b may be coated with the same coating 108 or another. In fact, the upper wall 106a may be coated with one material 108a, having one set of properties while the lower wall 106b is coated with a different coating 108b of different properties. In certain embodiments, the entire exterior or outer surface of the shell 102 may be coated with a coating material 108 selected for universal use on any and all sides.

The purpose of the coatings 108 may be singular or multiple. For example, the reinforcing material within the polymeric resin that forms the shell 102 is typically glass. It may be some other polymer, or a mixture of materials. However, the cost and performance of glass fiber make glass fiber an excellent candidate as a reinforcing material in a matrix of polymeric resin forming the shell 102 of each tie 100.

The coating 108 may provide mechanical damping, mechanical deflection, and stress relief, as well as protection against chafing. For example, a coating 108 may provide protection of the glass fibers and resin in the shell 102 from sharp objects, wear, chipping, impacts, and the like to which they may be susceptible. Also, the coating 108 may also provide protection against ultra violet or other electromagnetic radiation (e.g., sunlight and its constituent parts), weather (rain, freezing, dust, etc.) chemical attack, or the like.

On the bottom wall 106b, the coating 108 may have different properties to meet different requirements. For example, a significant performance concern for rail ties 100 is lateral ballast resistance. The lateral resistance parameter is important to the ability of railroad tracks to maintain their alignment over time and traffic. Thus, whereas a polymer and its reinforcing material forming the shell 102 may tend to have a comparatively lower coefficient of friction than, for example, a rubber or elastomeric polymer material, the ability to resist lateral motion may be improved by the addition of the layer 108b of a coating 108 on the lower wall 106b.

Moreover, protection against chafing by the rock within the road bed (ballast) supporting a rail tie 100 may reduce impact, distribute loads, prevent point loads, and otherwise maintain the integrity of the shell 102 under the force of compression represented by a train passing over the tie 100, and "grinding it into" the road bed. Just as a coating 108a on the upper wall 106a may prevent chafing by a rail assembly 110, the coating 108b may provide protection against the chafing of rock. It may provide increased resistance to lateral movement of the rail 112, which is longitudinal movement of the tie 100, with respect to the ground and the road bed.

In the illustrated embodiment, the rail assembly 110 includes a rail 112 crossing a sequence of ties 100. Each rail 112 is typically supported by a plate 114 that distributes the load of the rail 112 across a broader surface area of the shell 102 of the tie 100 than would be covered by the rail 112 itself.

Meanwhile, the rail 112 and its underlying, supporting plate 114 are maintained snug against the tie 100 by a keeper 116 securing the rail 112 to the tie 100. Typically, within the length of a tie 100, and typically comparatively closer to each of the ends 118a, 118b will sit a rail assembly 110, including a plate 114, a keeper 116 on each side of a rail 112, and the rail itself crossing that tie 100. Traditionally, fasteners 120 have been spikes 120 driven through apertures in the keeper 116 and plate 114.

Meanwhile, a portion of the keeper 116 extends over the bottom of the rail 112 in order to secure it in place. Typically, the keeper 116 registers the rail 112 along the length or longitudinal direction of the tie 100. Also, the keeper 116 holds the rail 112 down in contact with the plate 114, keeping both the plate 114 and rail 112 snugged down against the tie 100.

One may note that the top surface 122 and bottom surface 124 of the tie 100 are illustrated with a coating 108. The coating 108 is not required. In some embodiments, the resin selected to form the shell 102 may have a degree of flexibility that dispenses with the benefits or some of the benefits of a coating 108. Regardless, the top surface 122 may be referred to as the top surface of the tie 100, as completed with the coating 108, or absent such. Similarly, the bottom surface 124 may be the surface of the shell 102, or may be the ultimate surface of the tie 100 after the shell 102 has received a coating 108.

The rail 110 is constituted by an upper flange 125 that actually carries the wheel of a rail vehicle (e.g., locomotive, car, etc.) while a lower flange 126 provides a base 126 on the tie 100. A web 127 connects the upper flange 125 to the lower flange 126. Typically, the bending loads on the entire rail 112 render the "I" shape of the rail 112 an effective beam. In order to support the loads imposed on the rail 112, the I-beam construction provides for the maximum stiffness at the minimum weight required to support the load.

That is, the section modulus (used here as the term is used in engineering) is the mechanical property of a material that reflects the effect in bending. It reflects the location of the material away from the "neutral axis" near the midway line, as the maximum compression is imposed at one "outermost fiber" while the maximum tension is imposed on the opposite "outermost fiber." "Outermost" is at the points most distant from the neutral axis.

Thus, a rail car wheel presents a load in compression against the upper flange 125, putting it into local compression. Meanwhile, the lower flange 126 is placed in tension in response to the tendency of the rail 112 to bend between supporting points, such as adjacent ties 100.

The same principles of section modulus (an engineering term defining the exact relationship between the cross-sectional shape and the stiffness of that shape) applies not only to the rail 112 but also the shell 102. In the illustrated embodiment, the upper corners 128a, 128b of the shell 102 will typically be rounded at some value of a radius in order to minimize stress concentration factors at those corners 128.

Meanwhile, the lower corners 130a, 130b may actually be sharper corners, or more filled in. This will provide more material in tension, and thus stiffen the tie 100 by increasing the section modulus.

The section modulus is proportional to a power of the distance from the neutral axis to the outermost fiber. Thus, the overall stiffness is greatly improved by putting a comparatively small proportion of the overall cross-sectional area farther away from the neutral axis, and especially at or near the outmost fiber. The upper corners 128 and lower corners 130 need not have the same radius, nor contain the same amount of material.

Figure 2:
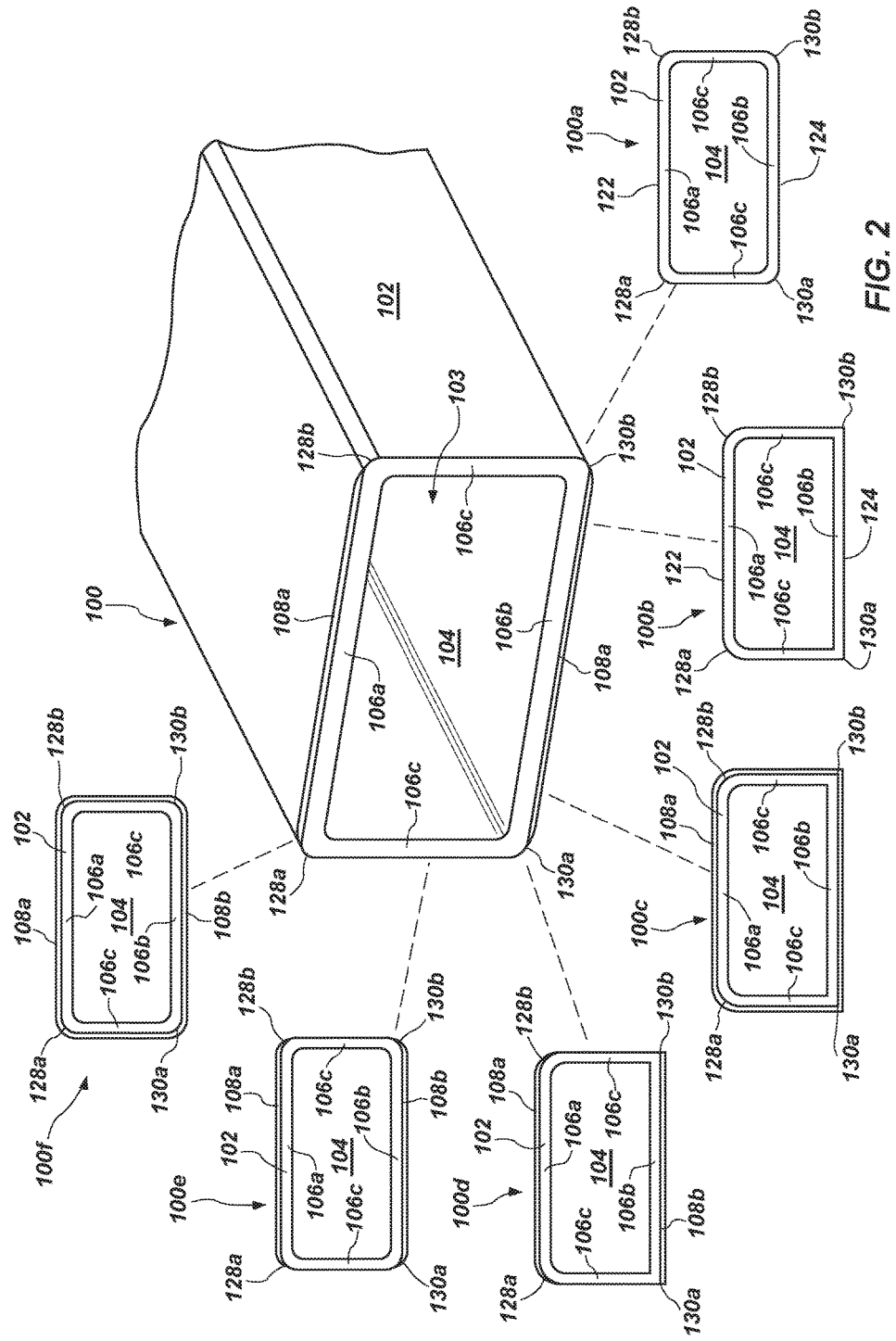
FIG. 2 is a perspective view of one end of a tie in accordance with the invention, also illustrating end cross-sectional views of certain alternative embodiments of the tie.
Figure 3:
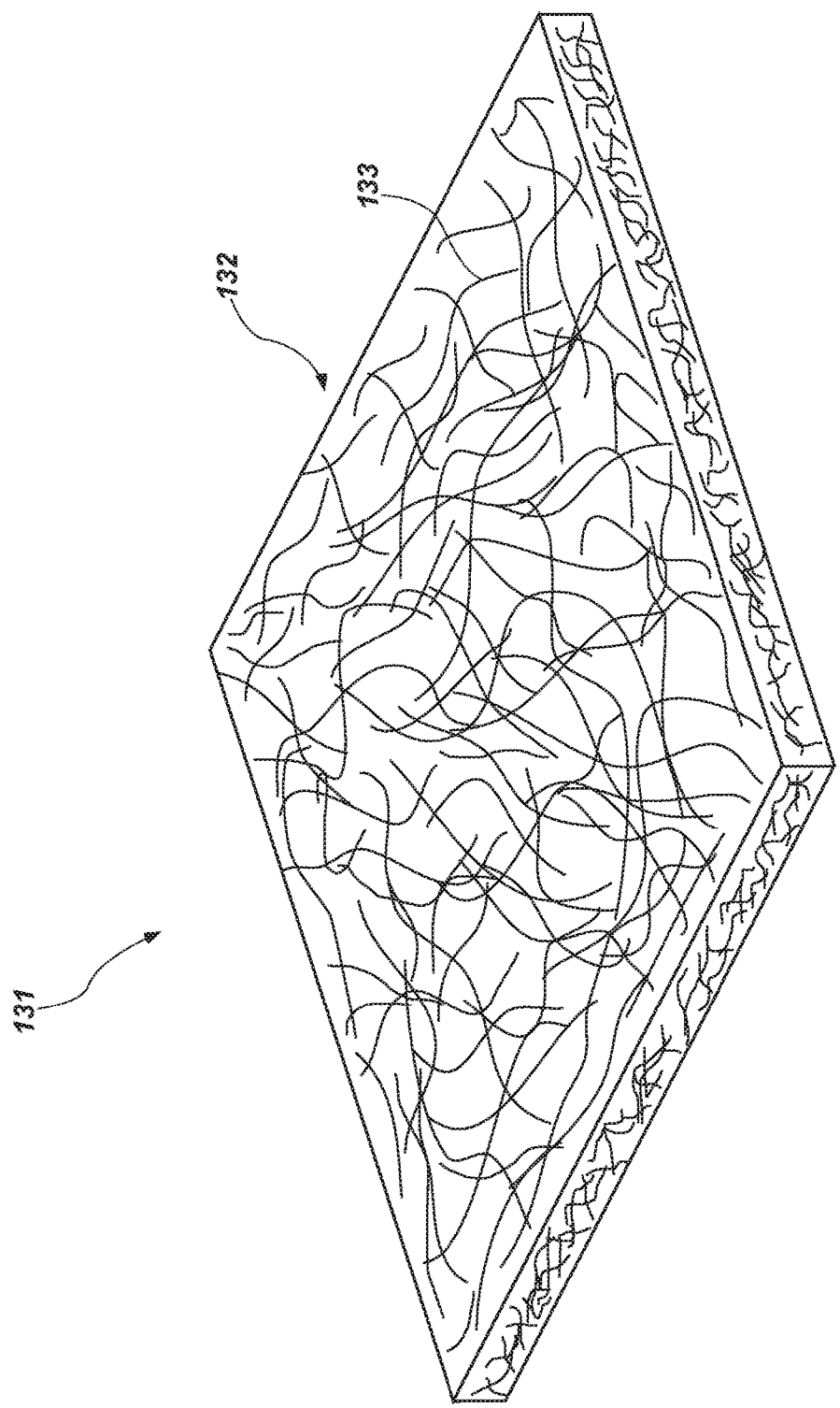
FIG. 3 is a perspective view of one embodiment of a continuous fiber mat (CFM) for reinforcing a composite construction for a tie in accordance with the invention.

Referring to FIG. 2, while referring generally to FIGS. 1 through 36, various cross-sections provide different benefits in a tie 100 in accordance with the invention. In the perspective view, the tie 100 is shown with a radius at each corner 128, 130. Nevertheless, the tie 100a is rounded on all corners 128, 130, as is the tie 100e and the tie 100f. In an alternative arrangement, the ties 100b, 100c, 100d have a comparatively sharp lower corner 130 on each side with the radiused corners 128a, 128b on top.

Likewise, the ties 100a, 100b are "bare" so to speak, having no coating 108. In contrast, the tie 100c is fully coated about its outer surface 122 while the tie 100d has a coating layer 108a on the top and a coating layer 108b on the bottom. Similarly, the tie 100e has a coating 108a on top with a coating layer 108b on the bottom, whereas the tie 100f is fully coated about its outer surface 122. Thus, in the various embodiments, the coating 108a may provide for protection against weathering from sun, rain, or chemical environments, as well as providing for resistance to chafing, stress concentrations (stress risers), or the like from loading by the plate 114 against the tie 100.

Meanwhile, each of the layers 108b or the portion 108b of the coating 108 about a tie 100 provides protection against stress concentrations, chafing, weathering, and other factors. Specifically, a suitable thickness of a coating 108b with the engineered properties of toughness, spring constant or elastic modulus, durometer value of hardness, texture variation along the surface thereof, and the like may be engineered to promote stress distribution of loads of underlying ballast rock against the bottom surface 124.

Likewise, the material properties of the coating 108b should be engineered to provide a coefficient of friction against the underlying ballast rock of the railroad bed to provide for lateral support of the railway, meaning resistance to axial motion by the tie 100 in its axial direction, which is laterally orthogonal to the travel direction of the rails 112 of a railroad system.

The fiber reinforced composite that constitutes the shell 102 may include one or more mats or the like. For example, a fiber reinforcement 131 or mat 131 may be constituted by a continuous filament mat 132 (CFM 132). This type of a mat 132 is manufactured by spinning out a continuous filament 133 (or actually many filaments 133) that are permitted, actually encouraged, to lie flat on a manufacturing surface. Typically, these many filaments run continuously, thus forming the continuous filament or filaments 133 of the mat 132.

Typically, some adhesive material is included to bond the various filaments 133 together into a mat of stable dimensions. The mat 132 thus becomes a non-woven fabric of sorts. The mat 132 has a thickness that may be selected in manufacturing to be of any desired amount. The dimensions of such a mat 132 may also be selected for length and width according to the desired shape into which it will be molded. In the illustrated embodiment, the filaments 133 overlap one another, cross one another, and otherwise provide a random layout of fibers extending without break.

Thus, structurally stronger than chopped fiber and other materials that are more easily molded, the mat 132 must be folded, deflected, formed, and so forth while maintaining its integrity, in order to form a particular shape. Such geometries as cylinders, rectangular tubing, and the like, may thus be formed by overlapping the edges of the mat 132. Of course, the mat 132 may be a continuous mat fed from a roll, into a molding system in order to form a fiber reinforced composite material of a particular shape.

Figure 4:
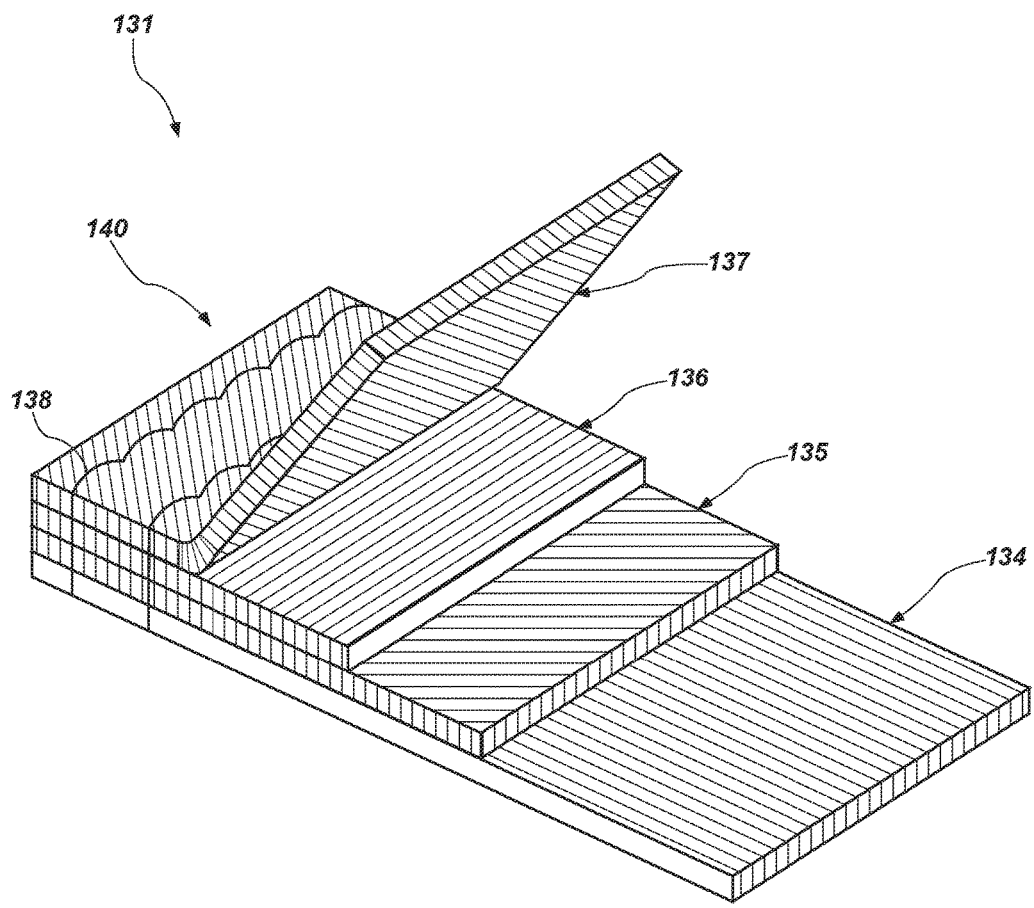
FIG. 4 is a perspective view of one embodiment of a stack-up of various oriented fibers being assembled into a quadraxial non-crimp-fabric (NCF) having four different fiber orientations directed to principal stress directions.

Referring to FIG. 4, in an alternative embodiment, a reinforcement mat 131 may be configured as a quadraxial layup in which the principal axes of zero degrees, 90 degrees, 45 degrees, and −45 degrees are all laid up in a single mat 131, constituting the quadraxial non-crimp fabric 140 or fabric mat 140. Longitudinal fibers 134 may be alternated with diagonal fibers 135 at 45 degrees, and followed by other orthogonal fibers 136 in a lateral direction. Thus, the longitudinal fibers 134 lie at 90 degrees with respect to the lateral fibers 136 and vice versa.

Meanwhile, diagonal fibers 135 at 45 degrees are juxtaposed to other diagonal fibers 137 at −45 degrees. Thus, the diagonal fibers 135, 137 are juxtaposed at 90 degrees to one another. Meanwhile, stitching 138 of a suitable fiber and suitable size may bind the various layers 134, 135, 136, 137 together in the quadraxial non-crimp fabric (NCF) 140.

Figure 5:
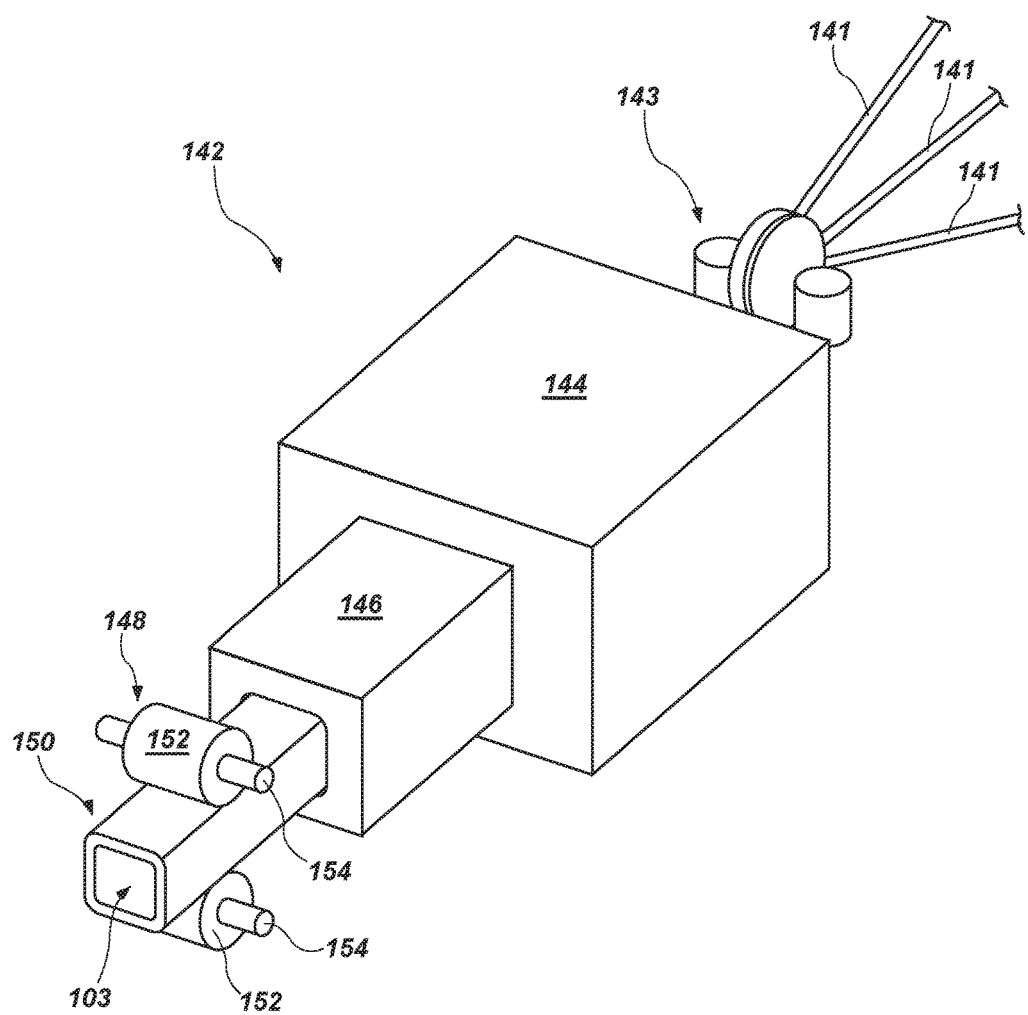
FIG. 5 is a perspective view of one embodiment of a pultrusion system for manufacturing rail ties in accordance with the invention.

Referring to FIG. 5, in one embodiment, a pultrusion process may occur in a pultrusion apparatus 142. Typically, rovings 141 of any particular form may be constituted by fibers, such as bundles of fiberglass. A roving 141 is typically not woven, but rather simply constituted by an untied bundle of fibers all progressing in approximately the same direction. Some amount of twist may exist, but it is not maintained by a tight twisting such as in a rope, nor necessarily any other ties between fibers. Thus, a roving 141 of fiber may be in any form.

In certain embodiments, the roving 141 may actually be a mat 131. In certain embodiments, the roving 141 may be a layup of multiple mats 131, constituted by both CFM mats 132 and NCF mats 140. After all, the thicknesses of the mats 132, 140 may be of any suitable size. For example, a layer of the fabric mat 140 may be on each side or each surface of a non woven, CFM mat 132.

Rovings 141 may be controlled and directed by guides 143 to orient the rovings 141 to pass into a molding system 144. In the illustrated embodiment, it is contemplated that the molding system 144 is a pultrusion system 142 that draws the rovings 141 or the roving 141 into the die, while pumps and presses drive the polymer matrix into the same die. As the fiber reinforcement mats 132, 140 pass through the molding system 144, they are completely soaked through with the resin matrix selected and exposed to curing conditions, such as the addition of heat.

Typically, the pultrusion system 142 may include a post processing system 146 for one or several purposes. For example, a post processing system 146 may include curing heat, cooling air or cooling liquids, cooled extension of the die cross-section, or the like. Ultimately, the post processing system 146 must discharge to a pulling system 148 a blank 150 or a tie blank 150. The blank 150 is a tie 100 of substantially infinite length. That is, the system 142 may operate continuously.

The pulling system 148 may include two, three, or four rollers 152 that grip the blank 150 between them. Rotating on or with shafts 154, driven by motors, not shown, the rollers 152 grip against the surfaces of the blank 150, drawing it out of the molding system 144. Tremendous forces may be involved on the orders of hundreds or thousands of pounds. High pressures (tens of thousands of Psi), high velocities, large pull forces (e.g., tons), and the like may occur.

Meanwhile, drawing the rovings 141, typically one or more of the mats 132, 140, as described hereinabove, is actually done by virtue of the continuous fibers of the mats 132, 140. Thus, initially, the system 142 is started up by drawing the rovings 141 completely through the system 152 with no resin. Thus, they may more easily fit through the die, and be grasped by suitable machinery or by hand downstream from the pulling system 148.

Once the rovings 141 can be initially drawn, resin can be added through the molding process and the molding system 144. Eventually, after cure and sufficient cooling to maintain proper strength, the blank 150 may exit the molding system 144. The post processing system 146, acting on the blank 150 as a solid that can then be manipulated mechanically by the pulling system 148, may provide a continuous production of the cross-section established by the dies in the molding system 144.

Ultimately, a station for cutting the blanks 150 to a standard length will be necessary, because the pultrusion process of the system 142, as illustrated, is a continuous process, not a batch process.

Figure 6:
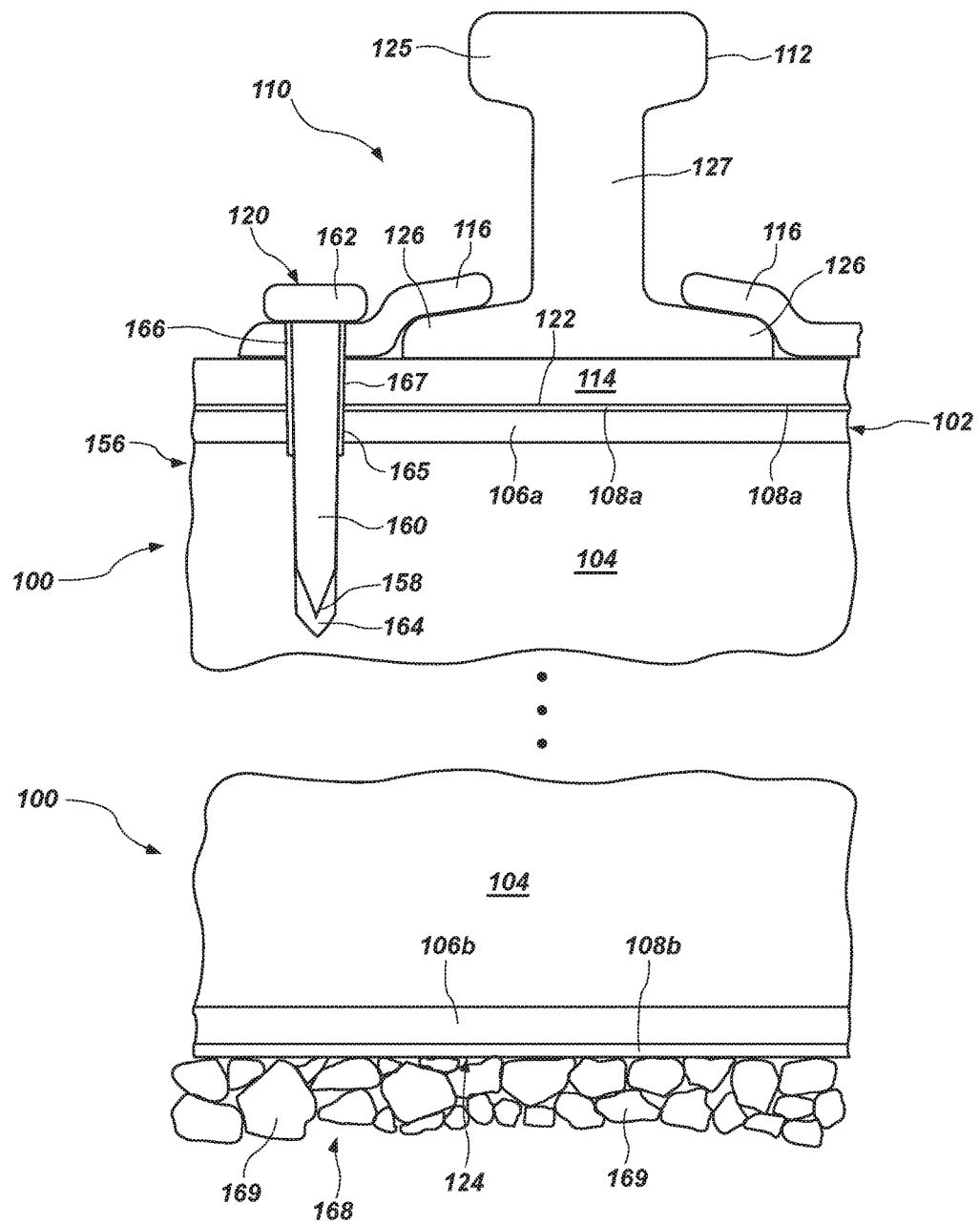
FIG. 6 is a side elevation, cut away, cross-sectional view of a portion of one embodiment of a tie in accordance with the invention, illustrating securement of a rail thereto on a supporting plate anchored by fasteners in apertures within the ties.

Referring to FIG. 6, a tie 100 is illustrated in cross-section, taken axially with respect to the rail, and in a transverse plane of the tie 100, parallel to the longitudinal direction of the tie, but also looking orthogonally thereto across the lateral width of the tie 100. Of course, the tie 100 may have any suitable height, illustrated by the illustrated break in the continuity of the fill 104. The fill 104 may be injected into the inner cavity 156 of the tie 100. The inner cavity 156 becomes the fill region 104 after completion.

As discussed hereinabove, the fill 104 may be concrete, lightweight concrete containing particles of an expanded polymer, special compounds of rubber, other elastomers, recycled crumb rubber bonded together by binders, expanded foams (expanded polymers) such as polyurethane resin (PUR), or the like.

In the illustrated embodiment, the rail 112 is seated on top of a plate 114, which plate 114 sits on the top of the surface 122 of the tie 100. The keeper 116 grips the bottom flange 126 of the rail 112. The keeper 116 is secured to the tie 100 by a fastener 120. The fastener 120 may have a point 158 at the distal end of a shaft 160 or shank 160 of the fastener 120. In the illustrated embodiment, the head 162 may be sized to support hammering or other driving of the fastener 120 into the fill 104 inside the tie 100.

In the illustrated embodiment, an aperture 164 in the tie 100 is sized to receive the shank 160 of the fastener 120 with a certain amount of interference. In some embodiments, the aperture 164 need not be provided in the fill 104. In such embodiments, a fastener 120, such as a lag screw or a common railroad spike 120 may be driven into the fill 104, which provides resistance, grip, and securement of the shank 160 therein. In other embodiments, a pilot hole 164 or aperture 164 may be sized to provide an interference fit in which the shank 160 compresses away from itself the fill material 104.

The fastener 120 may be made of a similar material, such as steel, reinforced polymer, or the like as the keeper 116. Accordingly, it would not be proper for the fastener 120 to be responsible to pierce by its point 158 the keeper 116 material. Rather, an aperture 166 in the keeper 116 may be fabricated therein or drilled after fabrication in order to provide easy access. Meanwhile, it is advisable that the aperture 164 at least pass through the shell 102 (the top wall 106a) in order to not fracture the material thereof. In the illustrated embodiment, an aperture 167 in the plate 114 is aligned and consistent with the size of the fastener 120, and the size of the aperture 166, and the keeper 116.

Likewise, the aperture 164 may have an upper region 165 or an aperture 165 that provides complete clearance with no interference for the shank 160 of the fastener 120. For example, the upper aperture 165 will typically be larger than the aperture 164 within the fill 104 in order to provide clearance for the shank 160 to pass through the upper wall 106a, quite freely, while providing interference substantial enough to secure the shank 160 within the fill 104.

The shank 160 may be threaded. Likewise, the shank 160 may be split and a swaging element 200 (See FIGS. 14 through 16) driven through the center of the head 120 and the shank 160 in order to separate the shank 160 into segments 204 that deflect and swell by the presence of the swaging element 200 to increase their "purchase" or grip and holding ability within the fill 104. As mentioned hereinabove, the aperture 164 may cease with the upper region 165, requiring that the point 158 and shank 160 penetrate the fill 104 without the assistance of a pilot hole 164 or other interference aperture 164.

On the bottom wall 106b, the support forces of the ballast 168 must support and counteract, in accordance with Newton's laws of physics, the load imposed by a train wheel rolling on the rail 112 supported by the upper wall 106a. Again, addition of a coating 108b on the lower wall 106b may be designed to provide more grip by the individual rocks 169 that form the ballast 168 of the railroad bed. In certain embodiments, the coating 108b may be comparatively softer than the coating 108a. For example, a material that may deform or mold over time, but not respond quickly, may encourage the rocks 169 against the bottom surface 124 to embed into the coating 108b, thus increasing the effective friction coefficient to a value greater than would otherwise exist between the smooth surfaces of such materials.

For example, a coefficient of friction operates according to the equation that a force of friction is equal to a coefficient of friction (usually the Greek letter Mu) multiplied by the normal force (force perpendicular) urging the two surfaces of the two materials together. Friction may provide a certain amount of resistance to the sliding in the axial direction of the tie 100, and thus in the lateral direction of the railroad, by the tie 100.

However, if the material of the coating 108b has certain adhesive properties, a certain degree of molding or forming to the rocks 169, or the like, then additional engagement may exceed a simple coefficient of friction between the rocks 169 and the tie 100. Meanwhile, as the ballast 168 settles over time, one may expect the tie 100 to settle into the ballast 168, also assisting in lateral resistance to motion by the railroad.

The ballast 168, according to studies on the subject, becomes more resistant to lateral displacement of ties 100, where lateral is with respect to the railroad direction. Resistance to motion along an end-wise direction for the longitudinal dimension of the tie 100 improves with consolidation of the individual rocks 169 together in the ballast 168. This suggests that the resistance of the individual rocks 169 to individual motion of one another may have increased. This may also indicate that a tie 100 has settled somewhat deeper into the ballast 168, thus providing some support for lateral loads on the railroad rails 112.

It may also suggest that the individual rocks 169 may have engaged more completely the bottom surface 124 of the tie 100. This may be a matter of individual rocks 169 cutting in or orienting to engage various depressions or concavities that may exist in the bottom surface 124. Thus, resistance is offered by a combination of friction, direct mechanical engagement by the rocks 169 of the bottom surface 124, and its various topography, as well as mechanical resistance by the consolidation of individual rocks 169 into the ballast 168 at either end 118a, 118b of the tie 100.

Figure 7:
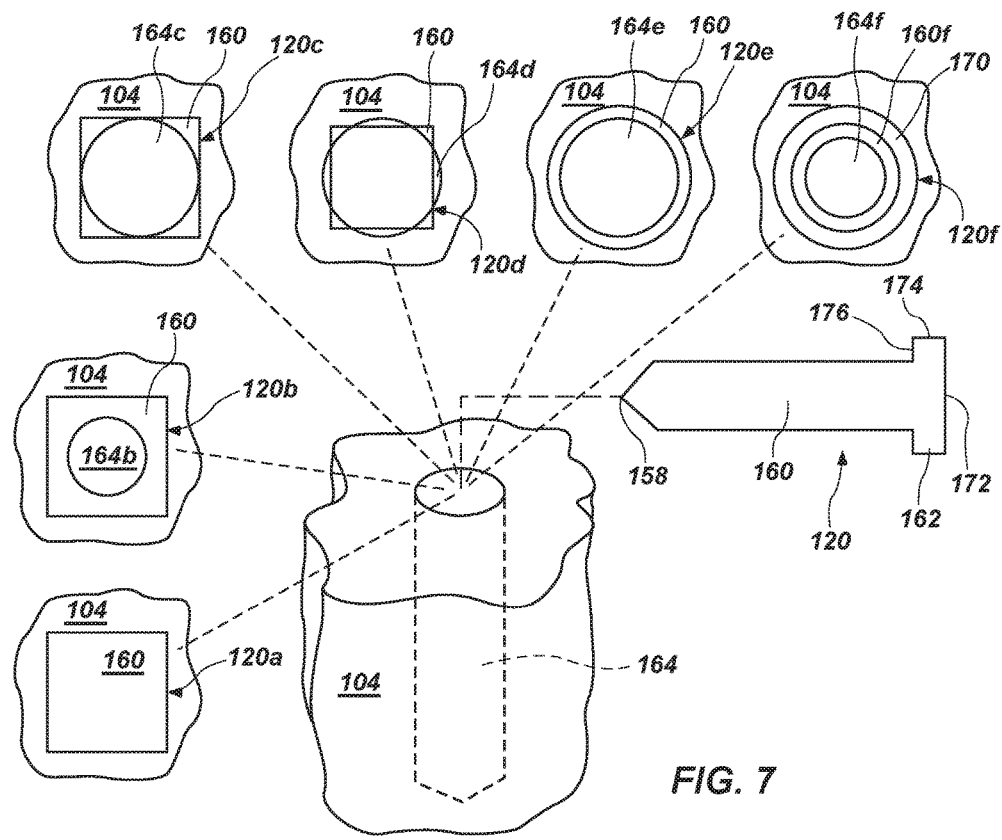
FIG. 7 is a perspective view, partially cut away, of a segment of a tie in accordance with the invention, having an aperture therein for receiving various shapes of fasteners having a variety of cross-sections, and varying amounts of interference.

Referring to FIG. 7, the fill 104 within a tie 100 is illustrated in a perspective view, and having an aperture 164 prepared therein. Typically, the aperture 164 may be drilled to extend through the shell 102 and into the fill 104. It is contemplated that various types of fasteners 120 may be installed to engage the inner surface of the aperture 164. Engagement typically may be facilitated by an interference between the outermost dimensions of the fastener 120 and a compressed portion of the fill 104 immediately surrounding the aperture 164. Thus, various embodiments are illustrated for the engagement of the fasteners 120 by the apertures 164.

In the illustrated embodiment of FIG. 7, various configurations of fasteners 120 are illustrated, penetrated into apertures 164. Various shapes and degrees of interference are illustrated. For example, a fastener 120 may be configured to have a round shape, threaded shape, barbs, segments that may be divided away from one another along axial cuts or separations, and so forth.

For example, in general, a fastener 120 may have a head 162 that is configured to receive a driver, such as a hex wrench, a bolt-like head 162 to receive an adjustable wrench or other hexagonal wrench fitting around the exterior thereof, or the like. The profile image of a fastener 120 illustrated includes a point 158 in order to engage the aperture 164, and possibly cut into the fill material 104. Likewise, the shank 160 is illustrated generically, and may be threaded, barbed, flat or smooth sided, textured, or otherwise designed to engage the fill 104 surrounding the aperture 164.

Meanwhile, it is contemplated that the head 162 has a top 172 into which a fitting for a wrench is formed into the head 162. Likewise, the edge 174 of the head 162 may be shaped to fit another type of wrench that engages the exterior surface of the edge 174. An example of this would be a conventional hex head commonly used with end wrenches, socket wrenches, adjustable end wrenches, and so forth. Similarly, square heads have been ubiquitous for centuries.

The effect of driving the shank 160 of a fastener 120 into an aperture 164 or simply directly into the fill material 104 is to grip the shank 160 in the aperture 164 or the material 104 such that the shoulder 176 of the fastener 120 maintains a compressive force against the keeper 116. Meanwhile, the keeper 116 maintains in compression the bottom flange 126 of the rail 112 against the plate 114.

As a practical matter, the function of a fastener 120 is to hold the lower flange 126 of the rail 112 in compression toward the tie 100. As a consequence of this compressive force exerted by the shoulder 176 against the keeper 116, and of the keeper 116 against the bottom flange 126 is to capture the plate 114 under the bottom flange 126 of the rail 112, thus maintaining the rail assembly 110 secure against motion in substantially all degrees of freedom (e.g., rail longitudinal direction, rail lateral direction, rail transverse/ vertical direction, and any bending or rolling about any of those directions as axes).

The fasteners 120a through 120f are simply alternative embodiments for the engagement by the fasteners 120 with the aperture 164, fill 104, or both. The fastener 120a is illustrated in cross-section with the shank 160 as it would appear embedded in the fill 104 immediately surrounding it without any pre formed aperture 164. Thus, for example, a spike 120a having a rectangular cross-section may be driven by force applied to a head 162 in order to drive the shank 160 into the fill material 104 without a pre-drilled aperture 164.

The fastener 120b is similar to the fastener 120a, having the same type of shank 160, but having a certain degree of relief provided by an aperture 164b that is nearly a pilot hole 164b. That is, the interference between the shank 160 and the aperture 164b is substantial. The shank 160 does not have to drive its own penetration into the fill 104, because the pilot provides a certain amount of relief. Nevertheless, substantial interference, and therefore substantial pressure on the shank 160 by the surrounding fill 104 may tend to hold the fastener 120b securely in the fill 104.

The fastener 120c provides less interference between the shank 160 and a substantially larger aperture 164b. The shank 160 must drive, cut, or otherwise displace the amount of fill 104 existing between the profile of the aperture 164b, and the profile of the shank 160.

By the same token, the fastener 120d is illustrated with an aperture 164d that actually has interference near the corners of the shank 160, and clearance between the flat sides of the shank 160 and the circumference of the aperture 164d.

In the embodiment of the fastener 120e, the outermost diameter of the shank 160 is larger than a drilled, circular aperture 164e. This may be a driven shank 160 that is simply driven like a spike 120. Alternatively, the shank 160 may be threaded, helical threaded, barbed, separable, or otherwise designed to engage the fill 104 surrounding the initial aperture 164e. Again, with the fasteners 120a through 120f, the fill material 104 and the aperture 164 in each will eventually conform to the outer surface of each of the respective shanks 160.

Thus, the illustrated interference is the interference that would exist before the shank 160 is driven into the aperture 164 or the surrounding fill material 104. The interference largely or entirely disappears, as the shank 160 forces the material 104 to move out of the path of the shank 160. One result is that the spring force or the elastic force of the fill material 104 provides a frictional, shear, or other engagement of the outer surface of the shank 160 by the material 104.

Likewise, the fastener 120f illustrates a comparatively small aperture 164f operating substantially as a pilot, with the shank 160f driving into the pilot aperture 164f, with threads 170 engaging by either displacing, cutting, or otherwise penetrating outward radially into the fill material 104. Thus, for example, the threads 170 or flutes 170 may compress the fill 104, or cut into it as the shank 160 drives down into the fill material 104, piloted by the comparatively smaller aperture 164f.

Figure 8:
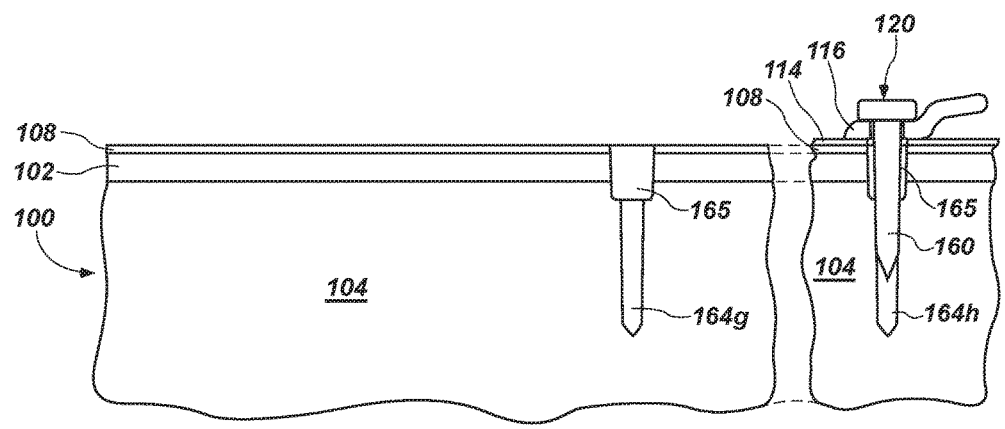
FIG. 8 is a side elevation, cross-sectional view, partially cut away, illustrating two different apertures for receiving fasteners into the tie in accordance with the invention.

Referring to FIG. 8, a rail tie 100 may have a distance or length of the tie 100 extending outwardly beyond the rails mounted thereon. That is, historically, ballast 168 supports a tie 100, and the tie 100 then supports two rails 112 or more running across or laterally across the ties 100. Thus, the ties 100 may extend substantially beyond the rails 112 in order to provide a spreading of the load represented by the rails 112 against the ties 100. Thus, fasteners 120 may exist on each side of each rail 112 toward each end 118a, 118b of a tie 100.

In FIG. 8 is illustrated one embodiment of an aperture 164g and an aperture 164h. In the illustrated embodiments, the aperture 164g has not yet received a fastener 120. In contrast, the aperture 164h has received a fastener 120 securing a keeper 116 and underlying plate 114 to the tie 100. The apertures 164g, 164h represent alternative embodiments.

In the embodiment of the aperture 164g, an upper aperture 165 represents additional space in which a fastener 120 may pass through the shell 102 without any substantial interference. Typically, the mechanical properties of the shell 102 are sufficiently stiff, hard, strong, brittle, and so forth, that the upper aperture 165 is not designed to stretch or displace to accommodate the fastener 120. Instead, a fastener 120 may be inserted through the upper aperture 165 without substantial resistance, after which interference will exist between a fastener 120 and the main aperture 164g, as described hereinabove.

One may notice that the upper aperture 165 may have a bottom surface that may be tapered, flat, or dictated by the artifacts of whatever type of tool is used to form it. Likewise, the aperture 164h is a mere pilot hole 164h providing nearly total interference between the fill material 104 and the inserted fastener 120. The fastener 120 in the aperture 164h is illustrated also with an upper aperture 165 terminating in a taper.

Also, no artifacts have been illustrated on the shank 160 of that fastener 120, because the shank 160 may be of any type, including rectangular, circular, or other shape in cross-section, such as a star, triangle, or any other suitable shape. Meanwhile, the shank 160 may also include threads, flutes, barbs, straight sides, textured sides, or the like in order to facilitate engagement by the shank 160 of the material 104 or fill 104 surrounding it.

Figure 9:
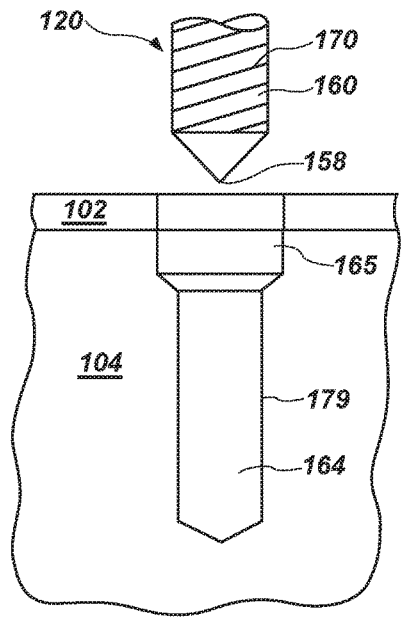
FIG. 9 is a side elevation, cross-sectional view of one alternative embodiment of an aperture for receiving a fastener into the tie in accordance with the invention.
Figure 10:
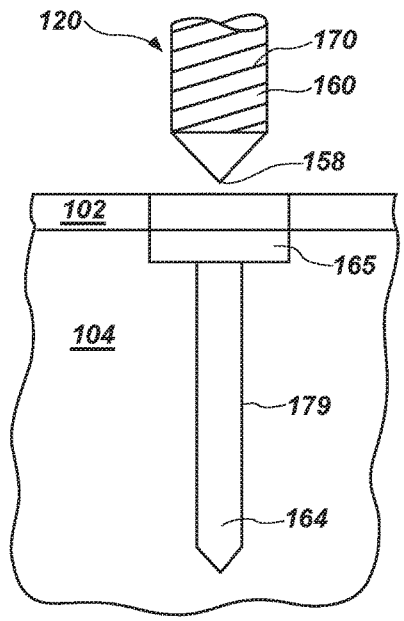
FIG. 10 is side elevation, cross-sectional view of an alternative embodiment of an aperture in a portion of a rail tie in accordance with the invention, this having more of a pilot hole configuration, with comparatively greater interference.
Figure 11:
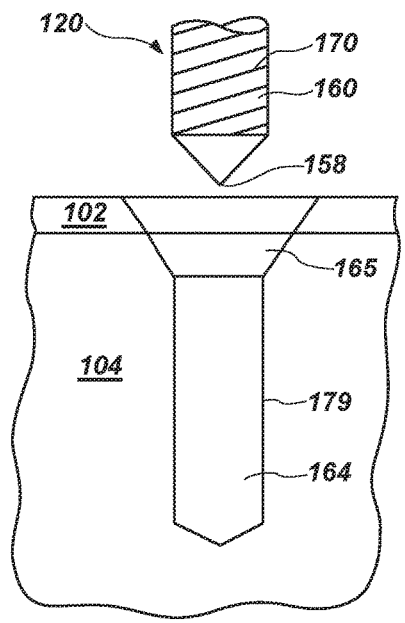
FIG. 11 is a side elevation, cross-sectional view of another alternative embodiment of an aperture in a portion of a rail tie in accordance with the invention, for receiving a threaded fastener, and having a counter sunk opening.

Referring to FIGS. 9 through 11, various embodiments of fasteners 120 are illustrated with their various shanks 160. Various configurations of apertures 164, and upper apertures 165 are illustrated. In each, a fastener 120 may be passed through an upper aperture 165 formed in the shell 102, and possibly, not necessarily, extending some distance into the fill 104. Eventually, the fastener 120 engages with threads 170 or other artifacts (features, shapes) on the shank 160, the outer walls 179 of the respective apertures 164.

The upper aperture 165 is substantially circular in cross-section, thus forming a right circular cylinder, but terminates with a taper such as may result from the point of a drill bit. Meanwhile, the upper aperture 165 of FIG. 10 provides a flat shoulder or milled bottom surface of the upper aperture 165. Meanwhile, the upper aperture 165 of FIG. 11 illustrates a countersink. Any of the apertures 164 providing any degree of interference with a shank 160 of a fastener 120 may use any appropriate upper aperture 164 deemed appropriate to accommodate the shank 160, a head 162, or the like.

No heads are shown for the shanks 160 of the various fasteners 120, because any head may be used. In fact, the threads 170 may be very comparatively short pitched, that is, the threads 170 are close together as a conventional screw. In other embodiments, the pitch may be extremely long including a single rotation or revolution or less of one thread 170 between the head 162 and the point 158. Thus, as a twist nail, each of the helical threads 170 may simply curve or rotate some minimum number of turns or a fraction of a turn in order to support driving thereof into the aperture 164.

Referring to FIGS. 12 through 17, various embodiments of fasteners 120 may engage the apertures 164 in the ties 100 in accordance with the invention. For example, a spike of FIG. 12 may be driven by placing the point 158 into the upper aperture 165 of any particular tie 100 and driven by pounding the head 162. The axial movement of the shank 160 causes engagement of the outer surface 179 or outer wall 179 of the aperture 164 by the surfaces 178.

Figure 12:
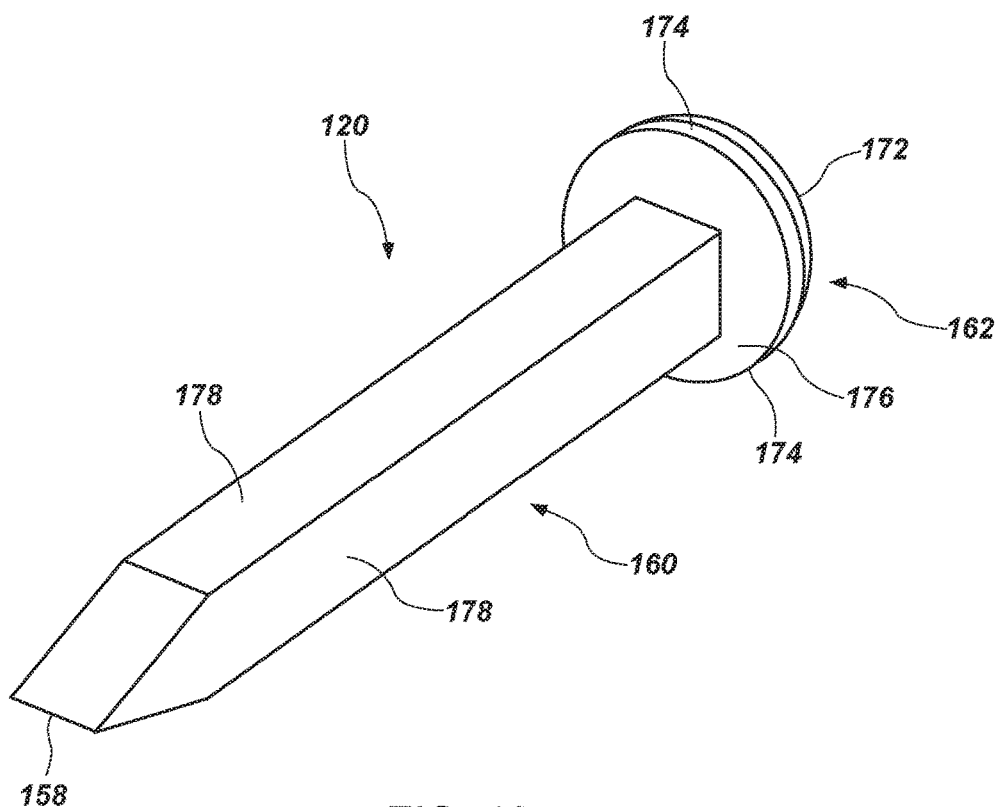
FIG. 12 is a perspective view of one embodiment of a fastener, a spike lacking threads and having a rectangular cross section.

Meanwhile, the edge 174 of a driven spike 120 of FIG. 12 need only have sufficient thickness to provide a stable shoulder 176 for securing the keeper 116 to the tie 100. Typically, a hammer or other driver may simply provide an impact load on the top 172 or upper surface 172 of the head 162, singly or repeatedly, in order to drive the point 158 and shank 160 deeply into the fill 104.

Figure 13:
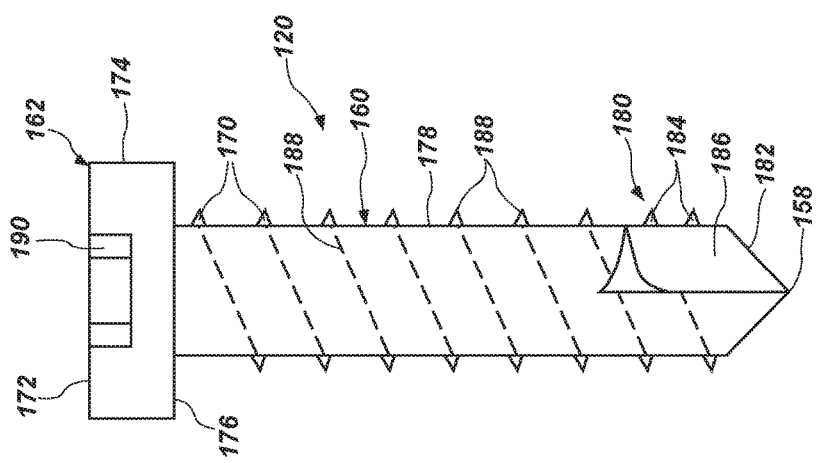
FIG. 13 is a side elevation, cross-sectional view of an alternative embodiment of a fastener having a self tapping point, followed by a threaded shank or shaft thereabove, and driven by a head shaped to receive an internal wrench as a drive tool for installing the fastener.

Referring to FIG. 13, on a threaded fastener 120 the threads 170 are shown in cross-section. The hidden lines illustrate threads 170 on the back side of the fastener 120.

A head 162, shows one embodiment of a hexagonal recess 190 for receiving a male hex wrench. In this illustrated embodiment, the point 158 is augmented by a tap 180 in order to render the fastener 120 a self-tapping device 120.

The tap 180 may include a drilling edge 182 or drill edge 182 that cuts as it passes into the fill 104. Meanwhile, a thread cutter 184 is formed by the relief 186 or relief region 186 cut into the distal end of the fastener 120. For example, typically, 90 degrees of arc may be removed from near the point 158 of the fastener 120. Leaving sharp edges on threads 170, renders them cutters 184. This self-tapping mechanism may assure that the shank 160 cuts into the fill 104, rather than simply pushing or displacing it outward, to engage the threads 170.

The crest 188 of each thread 170 may be thought of as the outermost point or extent of the diameter of the shank 160. Thus, the broken lines illustrate the hidden crest 188 of the threads as they pass around the back surface of the fastener 120 illustrated in cross-section here.

Figure 14:
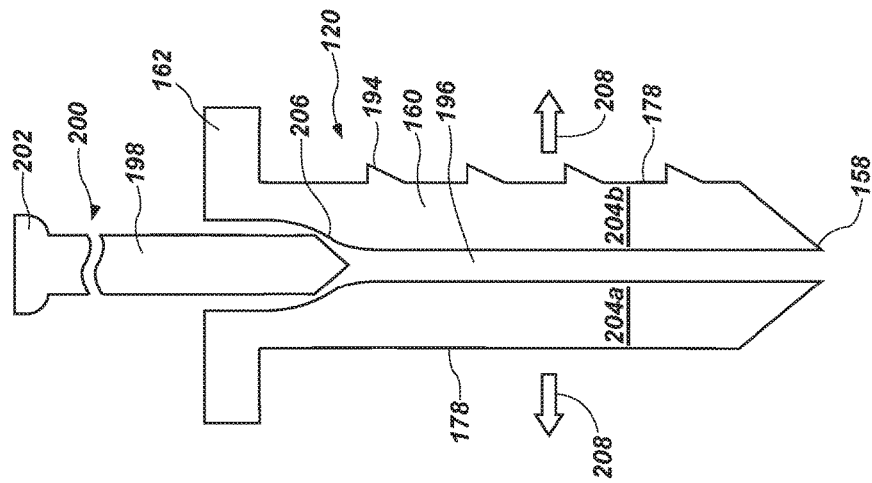
FIG. 14 is a side elevation, cross-sectional view of an alternative embodiment of a fastener illustrating two types of shanks, one barbed, and the other not, with a central channel within the fastener for receiving a spreader that operates as a wedge or swage element dividing the shank into multiple segments and spreading them away from one another in order to provide a riveting type of securement process in a tie in accordance with the invention.

Referring to FIG. 14, in one embodiment, a fastener 120 may act as a something of a rivet. In this embodiment, the shank 160 may include a surface 178 that is smooth, illustrated on the left side of the embodiment. Barbs 194 are illustrated on the right side thereof. The barbs 194 may be individual elements that extend or project away from the surface 178. Alternatively, they may pass completely and continuously around the circumference of the shank 160. They may appear like threads, completely circumnavigating the shank 160, but not progressing helically. Barbs 194 do not progress with rotation of the fastener 120. They progress by driving of the fastener 120 and shank 160 into the tie 100.

The fastener 120 is provided with a channel 196 down its center. Also, the shank 160 is divided into at least two, and preferably three or even four segments about its circumference. For example, the channel 196 may be formed as a slot passing straight through from side to side in one, two, or more directions. Alternatively, the channel 196 may be cut at 120 degree angles about the circumference of the shank 160, in order to render the shank 160 a rivet when the segments are separated.

The effect of the fastener 120 in service is to be driven by pounding, rotation, or both into an aperture 164 in a tie 100. A shaft 198 formed as part of a swage 200 or spreader 200 may be driven into the channel 196 after the shank 160 is fully engaged and fully penetrated into the tie 100. The swage 200 may be placed into the channel 196 after the shank 160 has been driven into the tie 100, or before.

For example, if the head 162 is adapted to fit a wrench and the shank 160 is threaded, the head 162 may be rotated to thread the shank 160 into the aperture 164. Alternatively, the swage 200 may be placed in the channel 196 after the head 162 has already been pounded to drive the shank 160 into the tie 100. By either mode, the head 202 of the swage 200 is hammered or otherwise driven in order to force the shaft 198 down the channel 196 with an interference fit.

The interference causes the shaft 198 to spread the channel 196, thus opening up segmented portions 204*a*, 204*b* (segments 204) into which the shank 160 is already divided (e.g., 2, 3, 4, etc.). The constriction 206 or shoulder 206 may be placed at an appropriate location along the length of the shank 160 to engage by interference the shaft 198. The result is swaging the segments 204 outward in an expansion 208 or expansion direction 208 also asserting a force 208 and motion 208 on the segments.

A peculiar benefit of the fastener 120 is that spreading 208 the segments 204 compresses the fill 204 between the segments 204 and the shell 102. Thus, the shell 102 now may assist more directly to retain the fastener 120, and thus provide a more affirmative engagement and securement of the keeper 116 and support plate 114 along with the rail 112 supported thereby.

Figure 15:
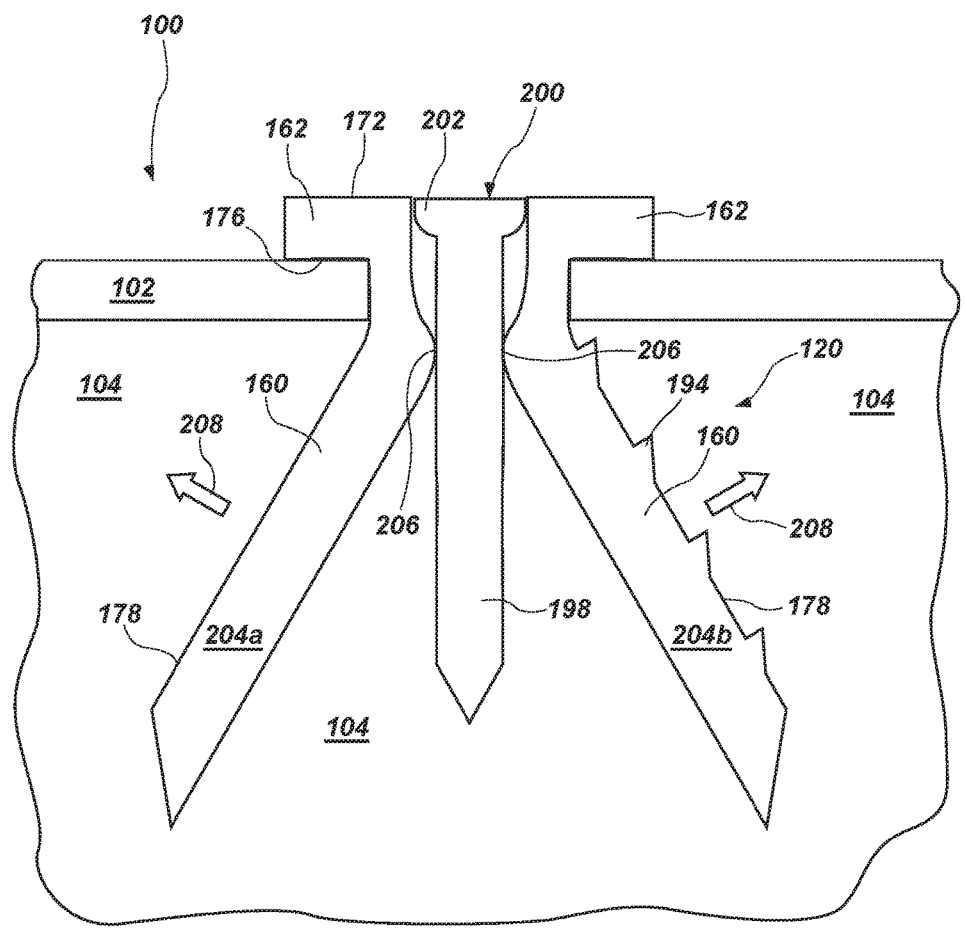
FIG. 15 is a side elevation, cross-sectional view thereof in a deployed configuration.

Referring to FIG. 15, one sees the approximate shape of the fastener 120 once the swage 200 has been engaged. One may note that the amount of interference between the shaft 198 of the swage 200 and the channel 196 may be selected, and may vary at any specific rate. For example, the shank 198 may have a degree of taper. The shape of the channel may also have some degree of taper providing a greater or lesser expansion 208 of the segments 204 and a higher or lower initiation of the spreading 208 thereof along the length of the shank 160.

Figure 16:
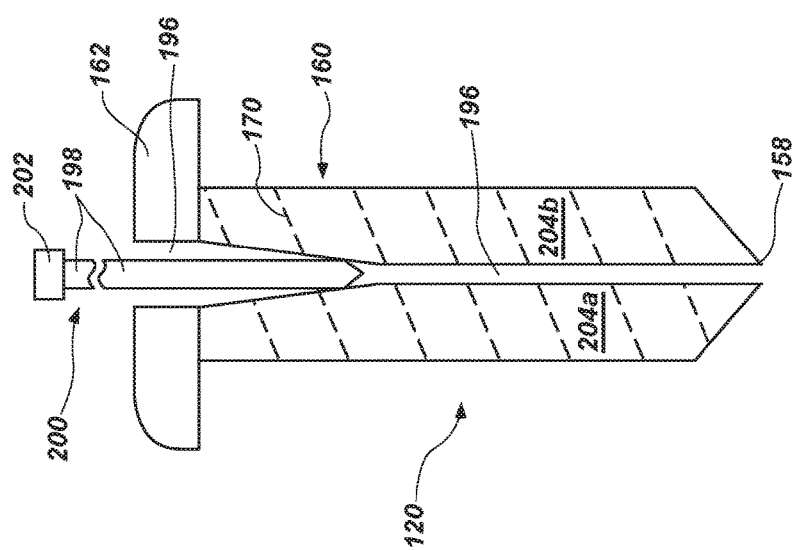
FIG. 16 is a side elevation, cross-sectional view of an alternative embodiment of a fastener, in accordance with the invention, providing threads on the shank, between the head and a point thereof, and including a swage element or spreader to spread the diameter of the threaded shank into multiple segments that may then spread apart and secure the fastener within a tie.

Referring to FIG. 16, yet another alternative embodiment of a fastener 120 may rely on a head 162 adapted to the use of a driver, wrench, hammer, impact device, or the like. The device may likewise have threads 170 and segments 204*a*, 204*b* representing either two, three, four, or the like segments 204 divided by a channel 196 into which is received a swage 200. In this embodiment, the channel 196 near the head 162 is sufficiently wide to receive the head 202 of the swage 200, while the shaft 198 thereof penetrates gradually into the channel 198, thus spreading apart the segments 204 from one another. In this embodiment, threads 170 are illustrated schematically and in broken lines inasmuch as they would be on the opposite side from the viewer of this cross-sectional view of a fastener 120.

Figure 17:
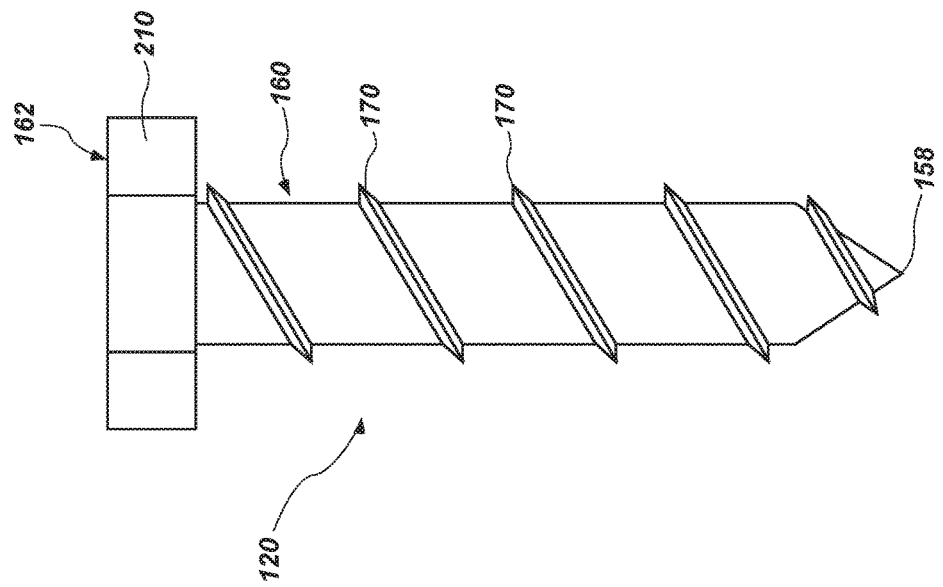
FIG. 17 is a side elevation view of an alternative embodiment of a fastener having threads on a shank and driven by a head, such as a hexagonal head adapted to fit the shape of a wrench.

Referring to FIG. 17, in this embodiment, a side elevation view of the fastener 120 illustrates an alternative embodiment of a head 162 having flats 210 or surfaces 210 shaped to receive a wrench thereon. In this embodiment, threads 170 or flutes 170 around the shank 160 render it a screw, lag screw, bolt, or the like. Any fastener 120 may have a shank 160 designed according to any of the embodiments illustrated herein, and a head 162 appropriate thereto for engaging the tooling or tool that will drive the fastener 120 into the fill 104 of a tie 100. The use of a pilot aperture 164 or other interference-based aperture 164 may assure securement of the shank 160 in the fill 104.

As a practical matter, the chemistry of the fill 104 or the structure may also be altered. For example, an oversized aperture 164 may be drilled or otherwise formed through the shell 102 and into the fill 104. Thereafter, a stiffer, stronger, or otherwise modified material may be infused into the aperture 164. This provides better distribution of forces into the fill 104, and better support against pull-out by the fastener 120. Thus, the aperture 164 may be drilled well over size and filled with a suitable holding material, which serves as a modified filler 104. Thereafter, a second aperture 164 is drilled for receiving and holding the shank 160 of any particular embodiment of a fastener 120.

Figure 18:
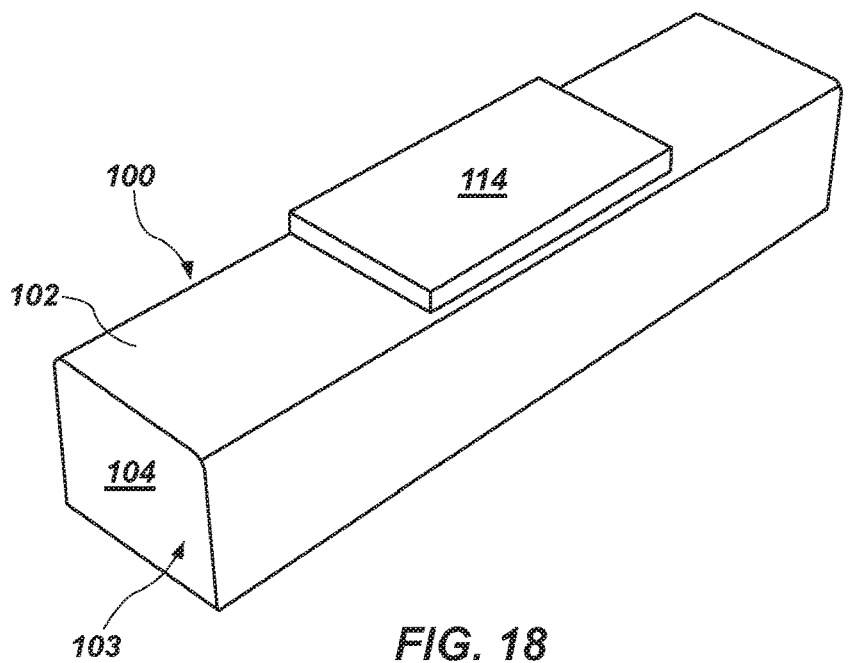
FIG. 18 is a perspective view of one embodiment of a portion of a tie evaluated with a top plate to determine the functional properties thereof in service.

Referring to FIG. 18, while continuing to refer generally to FIGS. 1 through 36, a configuration of a modelled tie 100 is illustrated. A tie 100 comprising a shell 102 containing fill 104 within the cavity 103 thereof was arranged with a plate 114 thereupon.

Figure 19:
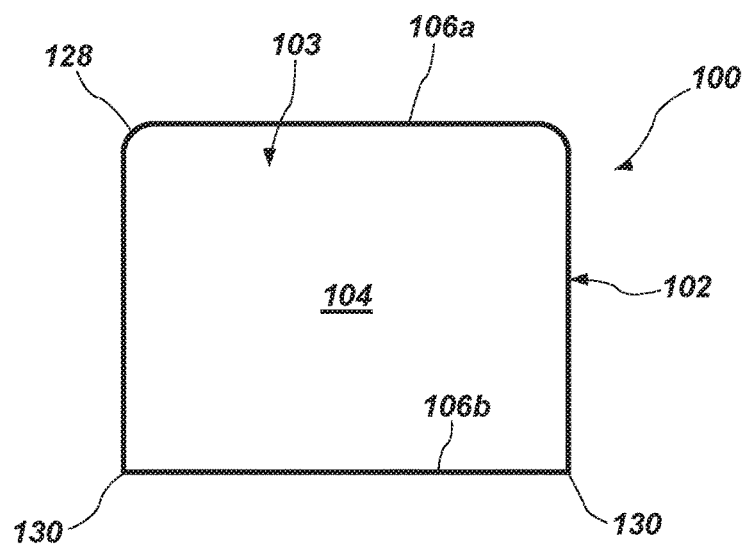
FIG. 19 is an end cross-sectional view of the tie thereof in an embodiment having sharper corners on the lower surface thereof, to increase the section modulus at the bottom extremum of the cross-section.

Referring to FIG. 19, a cross-sectional view of the tie 100 is illustrated. The height was about seven inches and the width was nine inches. Various radii for the corners 128 were posited. It was found that in order to support a conventional plate 114, the radius of 0.625 inches (two centimeters) was necessary in order to provide full support beneath the plate 114 on the upper wall 106*a* of the shell 102.

In the illustrated embodiment, in order to increase the section modulus (an engineering term used here in as per the engineering definition thereof) relating the cross-sectional area to the stiffness thereof, was increased by decreasing the radius on the lower corners 130 to approximate a sharp corner. Thus, more material existed at the outermost fiber. Analyses were done for the design in order to assess the functional performance of a tie 100 in accordance with the invention in service.

Referring to FIGS. 20 through 22, while continuing to refer generally to FIGS. 1 through 36, various properties of materials are identified. For example, referring to FIG. 20, the values 212*a*, 214*a*, 216*a* represent values corresponding to various constructions of the mat 131 or reinforcement 131 used in a shell 102 in accordance with the invention. The values 212 represent values corresponding to continuous fiber mat 132. The values 214 refer to the layered quadraxial non-crimp fabric mat 140. Each of these values 212, 214, 216 corresponds to a particular variable 220. For example, the variable 220*a* is the unidirectional modulus 220*a* along each of the principal axis of stress. The Poisson ratio 220*b* is also identified. Similarly, the shear modulus 220*c* along each principal axis is similarly identified. These properties are the stiffness properties of the shell.

Referring to FIG. 21, the chart or table illustrates variables 212, 214, 216 corresponding to the variables 220 identified in the table. For example, listed in the table of FIG. 21 are the tensile strength in the longitudinal direction, and compressive strength in the same direction. Again, the longitudinal direction 101*a*, the lateral direction 101*b*, and the transverse (e.g., nominally vertical) direction 101*c* are illustrated in FIG. 1 with respect with the tie 100. Thus, transverse tensile strength, transverse compressive strength as well as the through-thickness tensile strength and through-thickness compressive strength are illustrated.

One will note a great disparity between the longitudinal and transverse strengths compared to the through-thickness strengths. Of course this is to be expected considering the orientation of the fibers 134, 135, 136, 137 that carry the principal loads. The through-thickness strength is virtually only nominal.

Meanwhile, shear strengths in plane, transverse between the first and third planes and between the second and third planes are also identified. Here again, the values 212 correspond to the continuous fiber mat. The values 214 correspond to those of the quadraxial non-crimp fabric mat 140. Meanwhile, the properties 216 represent a value 216 for a hybrid relying on both the continuous fiber mat 131, and the woven or NCF mat 140.

Referring to FIG. 22, while continue to refer generally to FIGS. 1 through 36, the stiffness and strength properties of a polyurethane resin foam or expanded polyurethane resin at various values 222 of density are illustrated. In this table, the variables 220 are identified as variables 220d through 220h. The modulus of elasticity 220d the tensile stress 220e, the compressive stress 220f, the shear modulus 220g, and the shear strength 220h are all illustrated at various values 222. Those values 222 correspond to the variable 224 of density 224.

The values 226 of various densities 224, in pounds per cubic foot of the expanded polyurethane resin (PUR foam), illustrate the change in elastic modulus 220d, tensile strength 220e, compressive strength 220f, shear modulus 220g, and shear strength 220h with changes in density. This data illustrates the significance of density as it affects the mechanical properties of the fill 104. Meanwhile, the bulk of the fill 104 may be a material having one density. Inserts of a more dense material ay be placed into oversized apertures 164. This will facilitate better pull-out strength for the fasteners 120 as described hereinabove.

Figure 23:
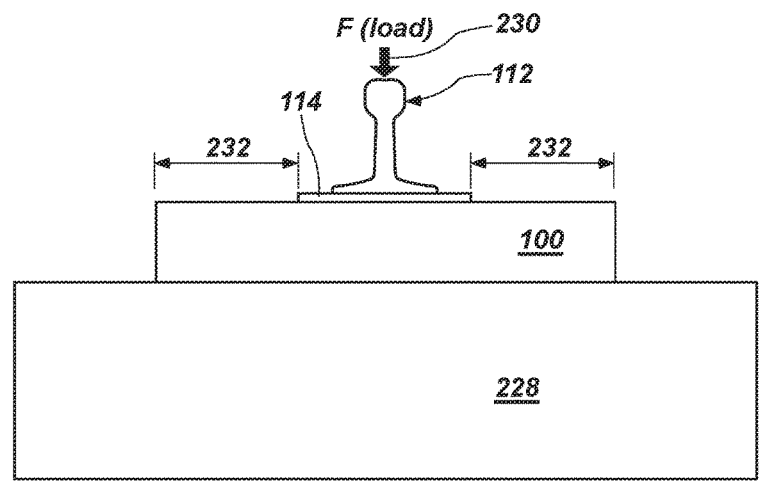
FIG. 23 is a side elevation view of the tie segment, surmounted by the compression plate and a rail, illustrated in cross-sectional view, as loaded for the evaluation.
Figure 24:
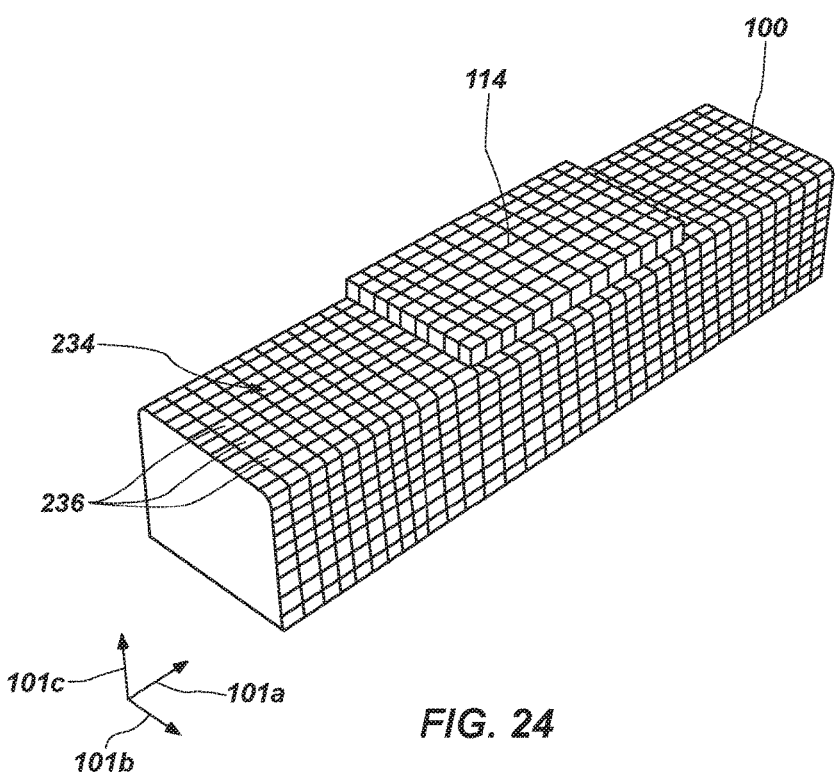
FIG. 24 is a perspective view of the grid or mesh of finite elements used in analyzing the performance of the rail tie.
Figure 25:
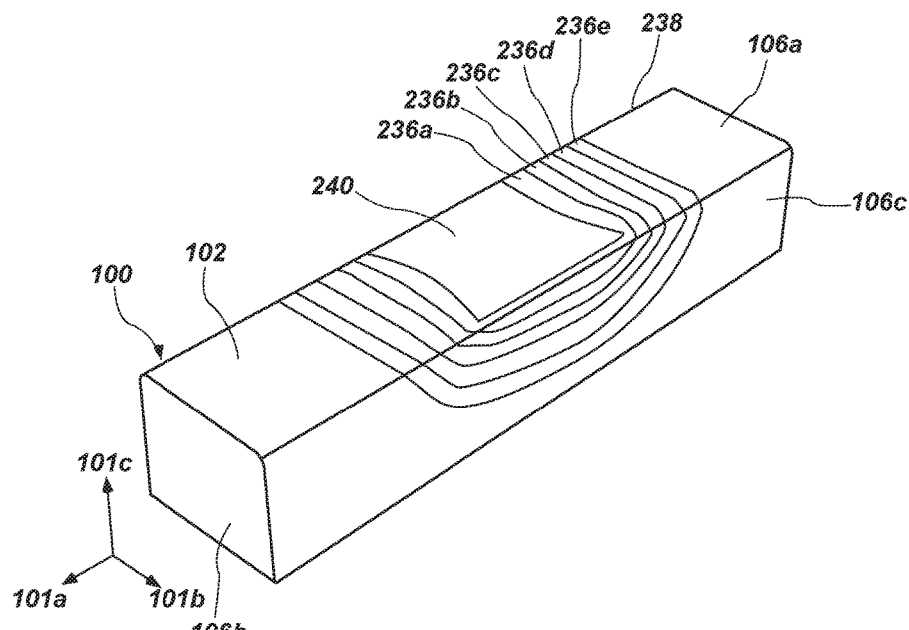
FIG. 25 is a perspective view of a distribution of vertical displacements thereof in the tie under compression loading.

Referring to FIGS. 23 through 25, the test configuration contained a rail 112 mounted against a plate 114, resting on a tie 100. The tie 100 relied on symmetry, having the tie 100 and the plate 114 centered along the length thereof, which was not full length for tie 100 in service. Rather, a segment of a tie 100 supported on a test fixture 228 provided a model of the tie portion under a single rail 112.

For example, the fixture 228 may be analogized to the ballast 168 of a road bed on which a rail tie 100 is supported along its length. Meanwhile, a force 230 was applied vertically to the rail 112, and transferred by the rail 112 into the plate 114, which in turn applied the load 230 to the tie 100. The tie plate 114 was centered such that the distances 232 from the ends of the model tie 100 were equal. The plate 114 had a length of about 14 inches (35 centimeters).

Referring to FIG. 24, for the analysis, the plate 114 and tie 100 were subdivided into a mesh 234 of individual elements 236 for analysis. The elements 236 represented the structural constituents as understood in the art of structural analysis for the finite element method (FEM) or the finite element analysis (FEA) as those terms are understood in the art of structural engineering analysis.

Referring to FIG. 25, the stress distribution throughout the tie 100 is illustrated as the sections 236a through 236e of various colors. The regions 238 and 240, in contrast represented considerably less stress. One will not that the stress distribution directly beneath the ends of the plate 114 was most intense, with the stress being eventually transferred away therefrom into the side walls 106c from the top wall 106a of the shell 102 of the tie 100. Meanwhile, the directions 101a, 101b, and 101c illustrate the longitudinal, lateral, and transverse directions 101, respectively. In the data of FIG. 25, the maximum elastic deformation at 100,000 pounds force needed to be no more than one quarter inch.

Figure 26:
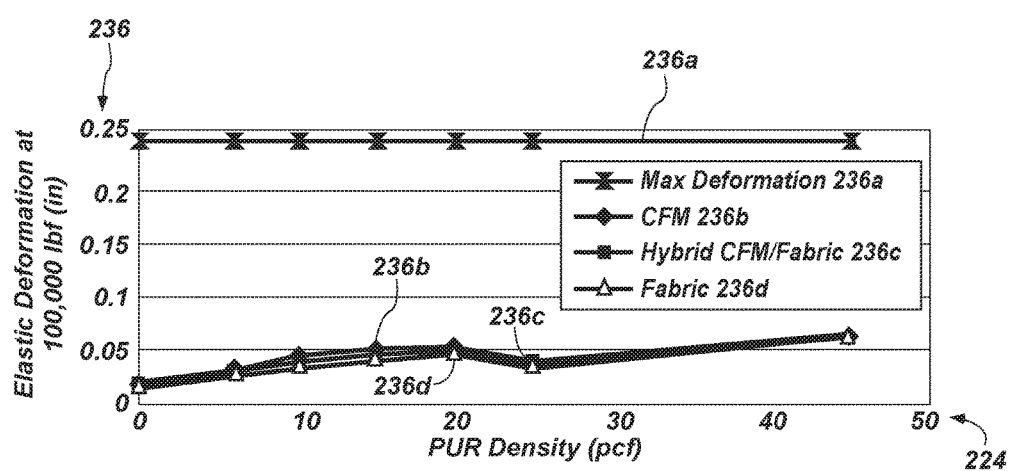
FIG. 26 is a chart showing curves of the elastic deformations thereof under a 100,000 pound force compressive load on a tie in accordance with the invention as a function of various constitutions of reinforcing fibers.

Referring to FIG. 26, the data illustrate the maximum limit 236a on deformation 236 along with the actual elastic deformation as a function of the density 224 of the expanded polyurethane resin. Notice that the various charts corresponding to the maximum deformation 236a permissible, the deformation 236b corresponding to the continuous fiber mat 131, are illustrated as falling much closer together than similarly situated some distance away from the maximum permissible 236a. Likewise, the hybrid chart or curve 236c is virtually coincident with the other curves 236b, 236d. In actual values, the fabric or NCF curve 236d is slightly lower in elastic deformation than is the hybrid curve 236c. Both of these are lower in elastic deformation 236 than is the curve 236b of the continuous fiber mat 131.

As a general proposition, the overall elastic deformation 236 is on the order of 0.06 maximum value 236 for all the configurations. This is well within the permissible 0.25 deformation in inches.

Figure 27:
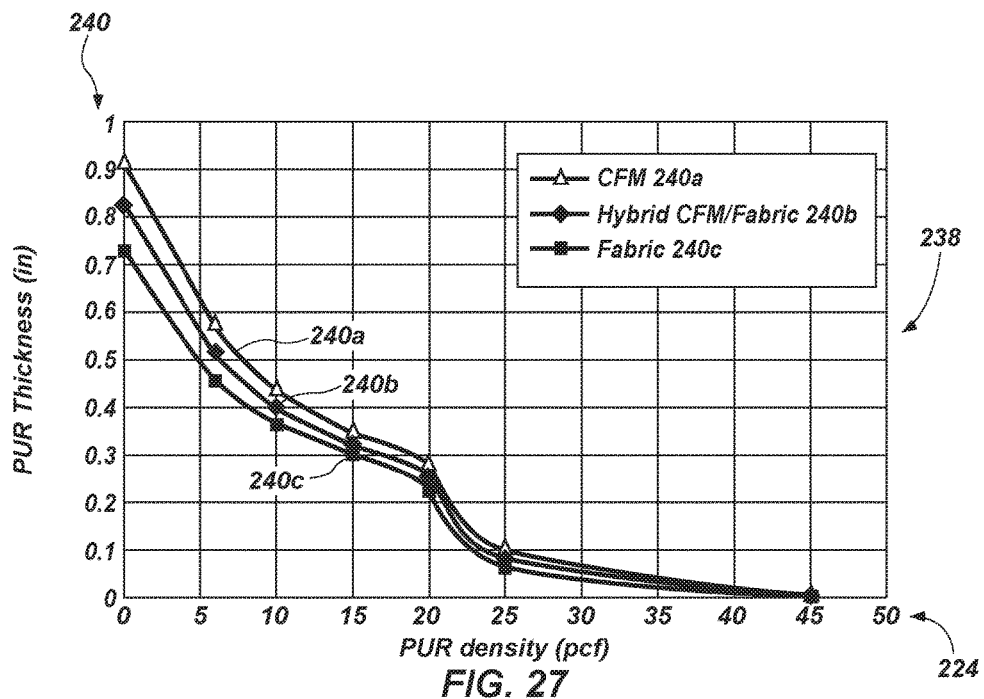
FIG. 27 is a chart illustrating various minimum values of shell thickness and polyurethane resin densities used in analysis to meet the compression, modulus of elasticity (MOE), and modulus of rupture (MOR) wherein the shell thickness-to-fill density region above the curves corresponds to safe tie designs according to the established criteria, and shell thicknesses or fill densities lower than the curves are considered unsafe.

Referring to FIG. 27, the chart 238 illustrates values of shell thickness or thickness of the walls 106 of the shell 102 plotted against the density 224 of the expanded polyurethane of the fill 104. In the chart 238, each of the curves 240a, 240b, 240c shows additional decrease in required shell thickness, between the curve 240a representing the continuous fiber mat 132, the fabric or NCF mat 140, with the curve 240c, and a hybrid thereof illustrated by the curve 240b. Again, as the density 224 of the expanded polyurethane resin increases, the shell thickness requirement decreases.

Figure 28:
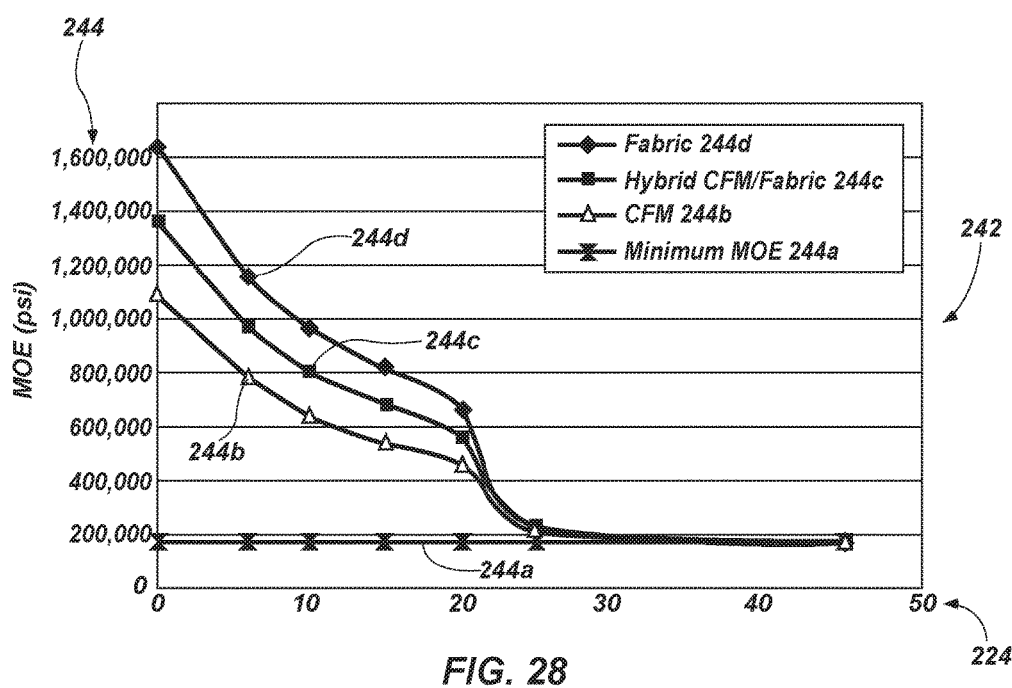
FIG. 28 is a chart illustrating values of modulus of elasticity as a function of fill density.

Referring to FIG. 28, the chart 242 illustrates values for the modulus of elasticity 244 plotted against the density 224 of the expanded polyurethane resin. Again, a minimum permissible 244a is identified and up to about a density of about 20 pounds per cubic foot of the PUR, the moduli of elasticity 244 all exceed the minimum permissible 244a by a substantial margin. Again, the value of the modulus of elasticity 244b for the continuous fiber mat 132 is seen to have the lowest value while the value for the modulus of elasticity 244c for the hybrid is intermediate that for the CFM curve 244b, and the modulus 244d or curve 244d corresponding to the straight NCF mat 140.

Figure 29:
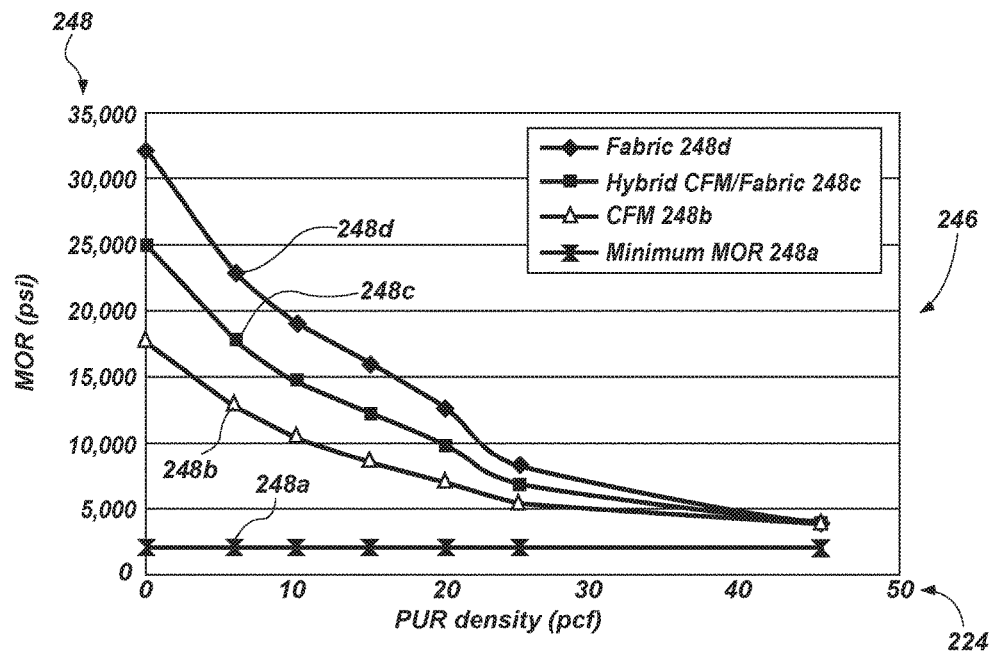
FIG. 29 is a chart illustrating values of modulus of rupture as a function of the fill density.

Referring to FIG. 29, a chart 246 illustrates values of density 224 of the expanded polyurethane resin or PUR foam in pounds per cubic foot, against the modulus of rupture 248 on the vertical axis. Each of the curves 248a through 248d illustrate the respective performances of the tie 100 having a shell 102 of the material identified in chart 246.

One will note again that the curve 248b corresponding to the continuous fiber mat 132 performs the most poorly, although well sufficient up to a PUR density of about 20. Thus, the curve 248b corresponds to the non woven continuous fiber mat 132, while the intermediate curve 248c illustrates that a hybrid performs intermediate the behavior of the NCF fabric curve 248d and the CFM curve 248b. As expected the higher the density of the PUR foam, the lower the modulus of rupture 248. Overall the modulus of rupture is not considered a critical parameter in any case even for the lowest values of shell thickness for heavy foam density in the range of about 45 pounds per cubic foot the modulus 248 is typically higher than minimum required.

Figure 30:
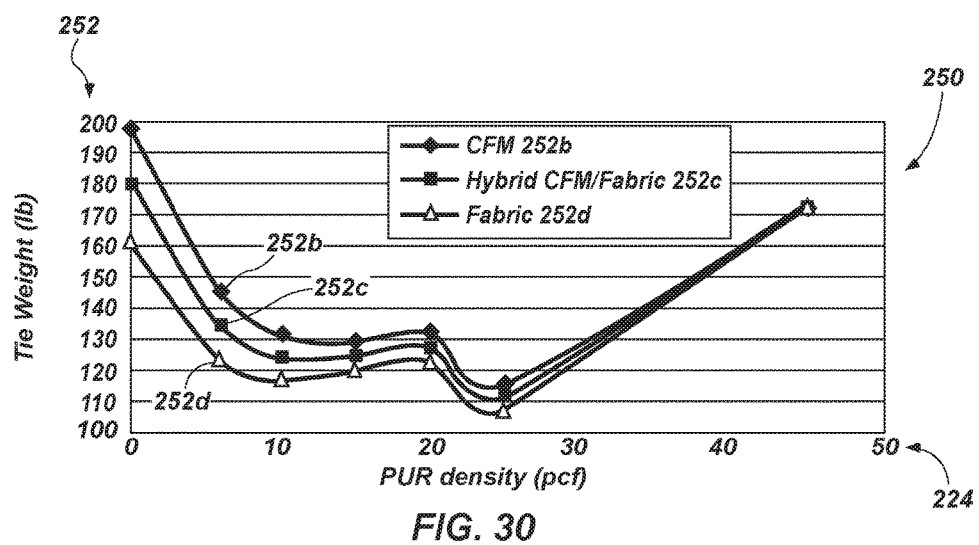
FIG. 30 is a chart illustrating the weight of a single rail tie, having a length of 102 inches, charted against the fill density along the horizontal axis, wherein each curve represents a different reinforcing fiber configuration.

Referring to FIG. 30, the chart 250 illustrates values of weight 252 along the vertical axis against the density 224 along the horizontal axis. Again, the curves 252b, illustrates the CFM mat 132, and the curve 252d corresponds to the fabric 140. The curve 252c is for they hybrid.

Figure 31:
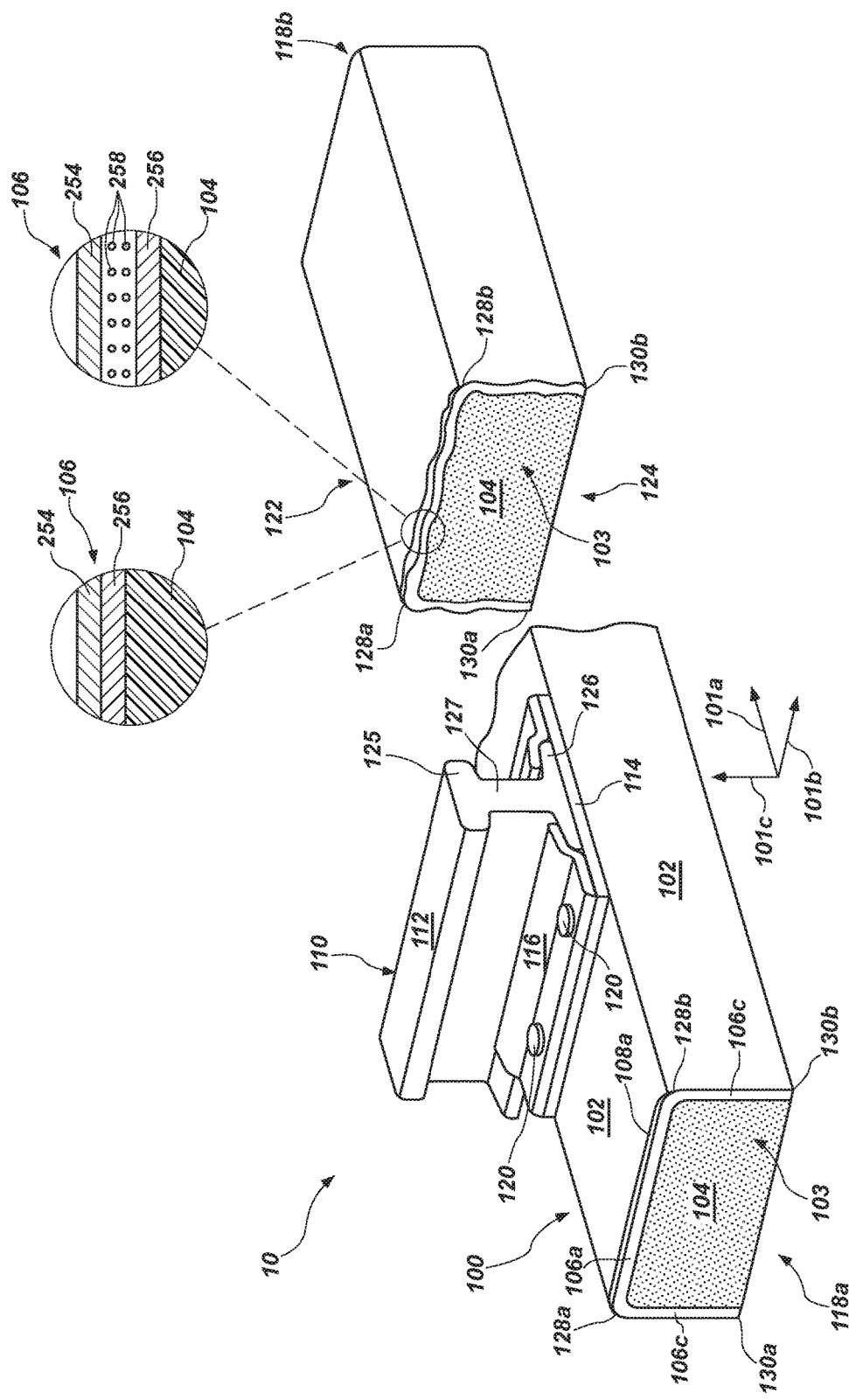
FIG. 31 is a cut-apart, perspective view of an alternative embodiment of a composite rail tie having no bottom wall, and thereby an open cross section for the shell containing the fill.
Figure 32:
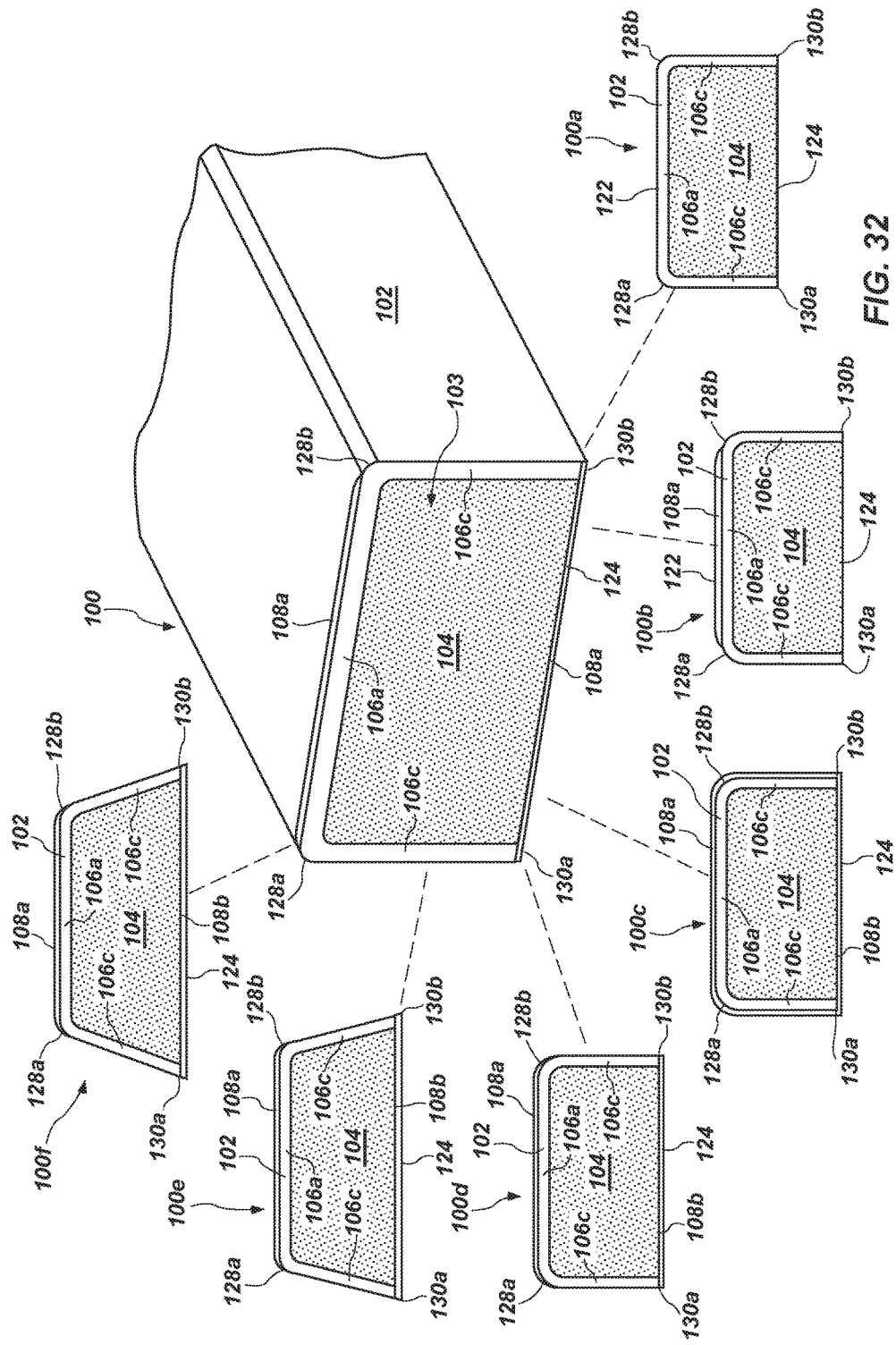
FIG. 32 is a perspective, cut-away view thereof illustrating additional cross sectional views of optional cross sections that may be fabricated in accordance with the invention.

Referring to FIGS. 31 and 32, while continuing to refer generally to FIGS. 1 through 36, in certain embodiments of an apparatus 10 or system 10 in accordance with the invention, the bottom wall 106b may be absent. It has been found that the deflection, strength, stiffness, and other mechanical properties of a tie 100 in accordance with the invention may operate satisfactorily without requiring the bottom wall 106b.

Accordingly, in this illustrated embodiment, the shell 102 includes the sidewalls 106c and the contiguous and continuous, typically uniformly molded or simultaneously molded (pultruded) top wall 106a. All are continuous, contiguous, and maybe effectively homogenous. That is, the same material, even though a fiber-reinforced composite. Therefore, the tie 100 is fabricated by manufacturing a shell 102 including pultrusion of all of the walls 106a, 106b simultaneously.

It has been found that additional stiffness may be necessary or beneficial in preventing excessive deflection by the top surface 122 of the tie 100 in order to reduce deflection of the top surface 122. It may be advisable to increase the thickness of at least the upper wall 106a or top wall 106a. It has been found that stress distribution through the walls 106 and into the fill material 104 is satisfactory by the time forces, pressures, stresses, loads generally, and so forth are transmitted from the rail 112 through the tie 100 and into the ballast below the bottom surface 124.

Testing has demonstrated that the integrity of the tie 100 is satisfactory, but deflection may be excessive at the comparatively thin dimension of the top wall 106a required for strength. Accordingly, stiffness benefits may accrue by increasing the depth or thickness and thus the "section modulus" of that top wall 106a. Accordingly, it has been found that the pultrusion of the shell 102 may include additional composite materials incorporated therein.

For example, hereinabove, the concept of rovings 141, fabrics 140, or fabric mats 140, and the like were described and explained. One aspect of pultrusion that sets it apart from most other manufacturing methods, such as batch molding, injection molding, pressing, extrusion, and so forth is the fact that reinforcement members contribute to the strength and stiffness of the cross section thereof. This supports pulling of the reinforcement members (e.g., rovings 141, fabric 140, and so forth) relied upon to provide tensile strength. This is true even within the die where the uncured polymer matrix lacks substantially any, and certainly not sufficient, tensile strength to provide any mechanical support for pulling.

In addition, pultrusion shares another characteristic with extrusion, unique to these processes. Typically, pultrusion and extrusion provide a continuous process in which the die continues to receive and discharge input materials and output product, respectively. This necessitates to a certain extent a requirement that the cross section of a pultruded or extruded part typically remain substantially constant. It need not be uniform throughout, but changes in the locations, densities, materials, and so forth are very difficult to make, yielding large unpredictability in a continuous pultrusion or extrusion process.

This is basically to say that the cross section will typically be constant (from a constant die cross section) along the length of an extrusion or pultrusion. It may still vary along its width, across its thickness, or the like.

In the instant case, this means to the illustrated embodiment of an apparatus 100 and system 10 in accordance with the invention, that a change in the thickness of the upper wall 106a or top wall 106a and, optionally, a change in thickness of the side walls 106c may be beneficial, possible, and even practical. The side walls 106c appear in testing to have sufficient stiffness in all applicable dimensions and sufficient strength. In all applicable dimensions, they serve at comparatively modest thicknesses shown herein. They are engineered and calculated to support the stresses, strains, forces, deflections, and so forth required for rail ties 100. Thus, whether or not to maintain a uniform thickness across the top wall 106a and the associated contiguous side walls 106c is optional. Thus, manufacturing convenience may be the criterion by which a determination is made.

However, it is beneficial to increase the bending stiffness or section modulus of the upper wall 106a and of the shell 102. The pultrusion process, or even an extrusion process, which is also an option, may embed different or disparate fillers. They may be distributed among the polymer matrix that cures to form the shell 102. They may bulk out the reinforcement members such as fabric 140, roving 141 or other fibers 133, such as a continuous fiber mat 132. Thus, in general, any mat 132, continuous fiber mat 132, other fibers 133, fabric 140 or rovings 141 may be formed with, or inserted around other spacing fillers that do not share the mechanical properties of such reinforcements.

For example, in one currently contemplated embodiment, long strands of filaments or other configurations of lighter polymers, such as expanded polymeric materials may fill in between the reinforcement fibers in the matrix of the upper wall 106a or other portions of the shell 102. This means, for example, that an upper surface or the uppermost reinforcement of any type of mat 131, 132, 140 or roving 141 may lie above a weaker filler, as well as below it. In the illustrated embodiment, another layer (filler) containing sparse amounts of reinforcement fibers and matrix polymer may constitute the majority of the bulk. It may be the literally over half the bulk, and often is many times more than the quantity of reinforcement matrix, devoted to the spacing material.

Materials such as expanded polystyrene (EPS, Styrofoam™), other materials, such as polyurethanes, natural fibers, other lightweight synthetic materials, and the like may fit within the thickness of the top wall 106a of the shell 102. In some embodiments, mats 131, 132, 140, or the like, alone or in combination may be formed into both the upper and lower surfaces of the top wall 106a.

Therebetween, or therewithin, may be distributed some smaller quantity of reinforcing fibers and the matrix polymer, interspersed with comparatively larger quantities of lightweight, low strength materials. The function of these spacing materials is simply the spacing apart of the reinforcement and matrix materials in the top wall 106a in order to increase the section modulus thereof. Thus, the strength of the top wall 106a may be calculated, engineered, and constructed so its stiffness suffices. Thus, additional stiffness is added by increasing the individual section modulus of the shell 102, especially, or particularly, in the top wall 106a.

Increasing the section modulus occurs by moving more of the reinforcing material and the matrix material enclosing those fibers toward outermost extremes (e.g., toward the "outermost fiber" in structural engineering parlance). The stiffness of the wall 106a is greatly increased without substantially increasing overall weight, and without substantially increasing material. In fact, the stiffness of the wall 106a may be greatly increased with virtually no increase in weight or basic reinforcement and matrix materials. Rather, comparatively lower cost, lower weight, lower strength filler materials may separate upper and lower layers of the top wall 106*a*, greatly increasing stiffness. In fact, even axial strength along the length of the tie 100 need not be increased in such a configuration.

For example, the insets of FIG. 31 illustrate on the left a conventional extrusion. A fiber reinforced matrix 254 or a typical composite is made up of reinforcement fibers in a polymeric matrix. This forms one layer. An alternative fiber-reinforced matrix layer 256 may also be adjacent thereto, interleaved therewith, or the like. Thus, any of the mats 131, CFM's 132, fabric 140, or roving 141 may be laid up in some particular order or arrangement to form a top wall 106*a*. The wall 106*a* captures and preferably adheres to the fill material 104 captured therewithin or captured by the shell 102.

In order to increase stiffness by increasing the section modulus (see any structural engineering text for this definition), the inset on the right shows an alternative embodiment. Here, different layers 254, 256, or fields 254, 256 of fiber reinforcement are in a polymer matrix 254, 256. They have bound or sandwiched between them a comparatively lighter weight layer 262. That layer 262 may include a rather sparse, fiber-reinforcement-filled polymeric matrix 258 as the structural constituent, surrounding a comparatively lighter weight, lower strength, more bulky spacer material 260.

In one embodiment of an apparatus and method in accordance with the invention, the fill material 260 may be fed as strands, comparatively bulky compared to the reinforcement fibers in roving 141, fabric 140, or other mats 131, 132. Thus, the fill material 260 may be secured against pressing through or migrating outward within the upper wall 106*a* during fabrication, through free rovings 141 or free fibers of rovings 141. This would suggest the benefit of having at least one layer of fabric in the fiber reinforced layers 254, 256. Thereby, the maximum strength and integrity at the outermost fiber may be assured, while the maximum amount of fill material 260 in the interior of the upper wall 106*a* also results.

In certain embodiments, it may be advisable to provide reactive polymeric adhesives between the fill material 104 and the wall 106 of the shell 102. In other embodiments, the fill material 104 inside the tie 100 may also have adhesive properties that bond. These provide stress support or bond pull strength and shear strength at sufficient tenacity to provide the stress support. They assure that the fill material 104 cannot separate from any wall 106 of the shell 102. Thus, whether reactive, to bond chemically, filled into a textured surface of the walls 106 in order to provide a mechanical connection, or otherwise, it has been found preferable to render the fill material 104 adherent to the walls 106 of the shell 102 in order to maintain integrity and best mechanical properties.

Referring to FIG. 32, in certain embodiments, a rail tie 100 may include various optional cross sections or stack ups of materials. For example, beginning clockwise from the lower right corner of FIG. 32, in certain embodiments, the walls 106 or the shell 102 may be open such that no lower wall 106*b* is used. Meanwhile, a cross section of the walls 106 may be constructed in any of the forms discussed hereinabove.

In the first cross sectional view proceeding clockwise, no coating 122, 124 is illustrated. Moving to the next cross section, a top coating 122 is added. This may assist in resisting chafing of the reinforcement fibers embedded in the matrix of the top wall 106*a* of the shell 102. The third clockwise cross section adds a full coating 108, including coating on the upper wall 106*a* as well as a coating layer 108*b* on the bottom surface 124. Meanwhile, the coating 108*a* covers all the walls 106.

Moving clockwise to the fourth cross section, a lower coating layer 108*b* sits juxtaposed to an upper coating 108*a*. In this embodiment, the coatings 108 are not entire, yet can protect against damage from ballast rock against the surface 124, and against chafing of the rails 112, and their attachment plates 114 against the upper surface or upper wall 106*a*.

In an alternative embodiment, the fifth cross section, counted clockwise from the lower right, is trapezoidal in shape. It may have any suitable angle 264. The angle 264 is not required necessarily for draft. Extrusion and pultrusion can produce products where draft is replaced with force. However, this angle 264 may provide for a more stable base. It may also provide an indication of what surface is to go against the ballast and which is to fit against the rail assembly 110, or the like.

One will note in the fifth cross section that only the upper layer 108*a* and lower layer 108*b* of coating 108 are relied upon. In the sixth cross section, the coating 108 is continuous from the upper coating 108*a* all the way around the side walls 106*c* to the bottom coating 108*b*.

In the seventh cross section illustrated, an inverse angle 264 results in an effective capture of the fill material 104 between the side walls 106*c* and the top wall 106*a*. In this embodiment, the fill material 104 is pressed against the upper wall 106*a* by the constraining side walls 106*c* in response to any bending moment on the rail tie 100.

Of course any of the illustrated cross sections may have a coating 108 on the top, on the bottom, all the way around the outer periphery, or the like. These are simply illustrations of various embodiments in which resistance to damage by ballast rock from below, rail assemblies 110 from above, general damage from handling, or the like may be minimized. One reason why this resistance to damage may be available and valuable is the fact that the matrix is typically much stiffer and less compliant than the coating 108. Coatings 108 may be filled or unfilled elastomeric polymers. Meanwhile, reinforcement fibers may be very much more stiff more akin to properties of conventional fiberglass and its composites. It is consequently more brittle. Its fibers are more easily broken individually by impact, chafing, sharp objects, and so forth.

Typically, the materials of the matrix material 266 compared to the embedded fiber material 268 may be any suitable structural polymer. Various thermoplastics may be used, but thermosets are usually stronger and more stable, thus better. A thermoplastic melts and remelts in response to elevated temperature. It is largely unchanged with remelting. Some degradation may occur, but the material properties and the ability to be remelted to not change dramatically.

In contrast, a thermoset is a reactive chemical mixture (e.g., like epoxy) in which the initial resins (monomers or mers) react, further polymerize, cross link, or both, resulting in a much stronger and stiffer solid. Moreover, upon reheating, such a thermoset polymer matrix will not melt or reverse its condition or state. Rather, it may be destroyed to the point of carbonization in its entirety, yet will typically still remain as an integral, monolithic solid. Its strength may be burned out of it by thermal degradation as it is reduced to a carbon matrix, but it does not melt or reconstitute to its original constituents.

Thus, in the illustrated embodiments, glass fibers, polyester fibers, carbon fibers, and other fiber or stranded material having a comparatively higher maximum tensile strength (stress) may be embedded in a polymeric matrix having a comparatively lesser (maximum) tensile strength (stress). Meanwhile, the filler 104 need have even much less tensile strength than any of the foregoing.

In order to control costs, the fill material 104 may be a mixture such as recycled crumb rubber chopped up and embedded within a polyurethane foam. Thus, bulk, density, stiffness, and the like may be imparted, while requiring much lower expense in fillers than in the matrix polymers.

For example, recycled crumb rubber (RCM), sand, organic natural materials, sawdust, etc. are comparatively inexpensive. Polyurethane foam is comparatively more expensive. Meanwhile, any polymeric matrix 266 is comparatively more expensive.

Likewise, the reinforcing fibers 268 are typically used because they are both less expensive than the matrix 266 or polymer 266, while also having better structural strength along their length. Meanwhile, their compressive and tensile strength between fibers 268 is dictated strictly by the matrix 266 itself (unless fibers cross), which provides all the compressive and tensile support laterally with respect to the longitudinal direction of fibers 268.

In one embodiment, the fill 104 may be any of the foregoing fill materials, as discussed. Any of these may be an expanded polymer, beads, bubbles, or the like having an engineered fraction of gas or gaps. This type of light, weak, space-filling additive reduces weight without substantially decreasing strength or stiffness modulus (section modulus as understood in engineering) of the polymeric matrix around it. In addition, other fillers enforcing a specific size of gaps (gas, cell, etc.) may also be included.

Particles of expanded polymers, such as polystyrene, will reduce the weight of concrete. It also provides additional toughness against fracture. Point loads, sharp impacts, and the like will often fracture conventional concrete.

The addition of other polymeric fillers that introduce not only a polymer but additional entrapped air in the expanded polymer have been found to provide additional toughness and resistance to fracture. Moreover, the addition of an expanded polymer, such as expanded polystyrene may permit, or perhaps more clearly enable, the engineered control of density of the overall fill 104 when installed. This enables creation of ties 100 of substantially any desired mass or weight. Thus, strength, durability, and other mechanical properties including limits on stress, strain, and the like may be engineered into the product.

Expanded polystyrene (EPS) pellets may be formed of any suitable size. They are commonly available in sizes below one eighth inch diameter. These may be mixed into polymer matrices such as polyurethane thermoplastics, epoxy, other thermosets, or the like to reduce density and increase the gaps in the structural material. Polystyrene foam (EPS) may be mixed in so long as temperatures or processing do not melt it or otherwise destroy its effectiveness.

Also, has been found that permanent "bubbles" or air gaps may be enforced by the addition of microspheres. Microspheres are available from various suppliers and in a variety of materials. Some are simply "bubbles" of air captured in hollow, glass spheres. Others are hollow polymeric (plastic) spheres.

For example, Minnesota Mining and Manufacturing Company, also known under the trademark of 3M™ is one supplier of glass bubbles. This company provides numerous manufacturing designations for glass bubbles of type K and type S. The majority of the material is a soda lime borosilicate glass. This constitutes the vast majority of its mass with a small percentage remaining of a synthetic, amorphous, crystalline-free silica. The material is effectively a hollow glass bead or a hollow glass bubble.

The shape is basically a hollow sphere having a comparatively thin wall. In fact, a specific gravity of the beads is on the order of about 0.1 to about 0.6. Since specific gravity is compared with respect to water at standard temperature and pressure, this gives a density of from about 0.1 to about 0.6 grams per cubic centimeter. Typically, the material is sufficiently fine that it may appear as a powder. That is, with a diameter of less than 100 microns, the beads look like a small or finely divided material. This may be considered a powder, although not necessarily the irregular or plate-like shape of a talc or other powders.

Processing may be by typical pultrusion, extrusion, injection, and other molding processes. Of course, the nature of the glass bubbles is such that they may be fractured if processed overly aggressively. For example, very aggressive, high-shear stress in vigorously mixed environments may damage them. Likewise, point contact shear such as is found in gear pumps, certain types of roll mills, and the like may be problematic. Similarly, excessive processing in screw extruders may necessitate careful and late placement of the glass bubbles in the flow.

Properties include a comparatively high cross strength of about 18,000 pounds per square inch (psi). In certain commercial densities, the average diameter may be about 30 microns, with a specific gravity of about 0.6, corresponding to about 0.6 grams per cubic centimeter, since specific gravity is simply a comparison with the density of water.

Being glass, the temperature in which such glass bubbles melt or begin to soften is typically greater than 600 degrees centigrade. Meanwhile, less than one percent of volatiles exist. The glass material is not soluble, and therefor integrates well with virtually any polymer as the matrix in which such glass bubbles may be used as a fill. In one embodiment, such glass bubbles are sold under the designation S60HS glass bubbles from the 3M™ company of Minneapolis, Minn. USA.

Various other suppliers exist for micro bubbles or microspheres. Not only hollow glass but also polymeric or plastic spheres are sold under the trademark Sphericel™. These typically have a density range of from about 0.14 to about 0.8 grams per cubic centimeter. They are used to add to various types of coatings, structural materials, sealants, putties, adhesives, and so forth. Although useful in thermal plastic molding, these have some of the same limitations as glass spheres. Moreover, their melting temperatures are much below the softening temperature of glass.

One interesting property of plastic microspheres is that they may include a blowing agent or expansion agent within an unexpanded microsphere. Thus, for example, in certain embodiments, an encapsulated gas or other expansion agent will react to heat. Thus, as the thermoplastic shell softens, the volume of a microsphere of plastic may actually expand up to about 40 times its initial volume, or even more. Thus, these microspheres may be added to polymers during processing, and experience their expansion during the heat of processing. Meanwhile, in operation, they provide stable expansion or stable fill having a substantially reduced density (as a gas or air) compared to the remainder of the matrix in which they serve as fill.

The net effect is substantial reductions in weight with improved performance in receiving and holding a spike. Space into which a spike can deflect or direct the matrix material is a valuable aid to entry and securement. The result includes a reduction in cost in accordance with reductions in weight of the base matrix, and an ability to design a tie 10 suitable for the specification of the individual customer or purchaser.

As described above, the use of lightweight fill materials to enforce and to size the gaps in the basic structural or matrix material assist in maintaining the desired mechanical properties of the gross fill 104. For example, as seen from the data, the difficulty is not one of strength. Thus, the improvement of section modulus while using less of the principal material to fill 104 does not substantially effect negatively the stiffness modulus or section modulus of a tie 10 in accordance with the invention.

Figure 33:
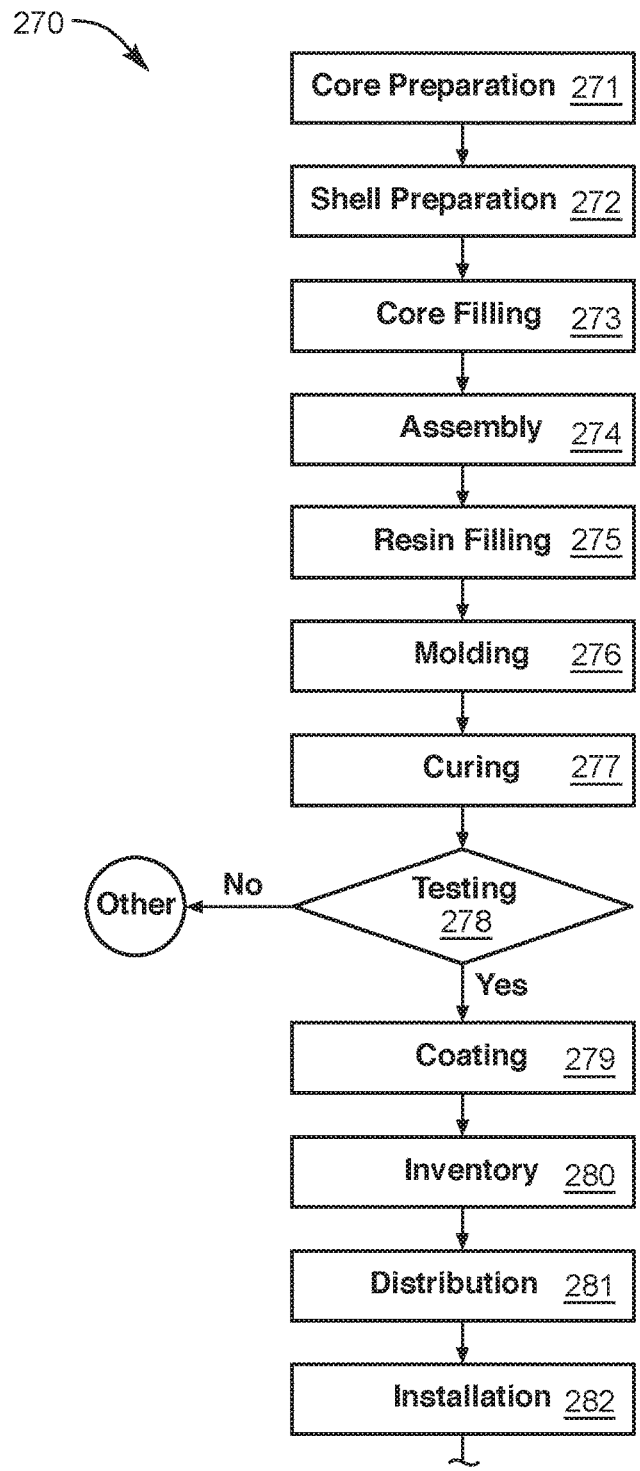
FIG. 33 is a schematic block diagram of a process for creating a composite, protruded rail tie, having a conventional, used, rail tie as a core or principal filler inside thereof.

Referring to FIG. 33, particularly, but FIGS. 33 through 36 primarily, while continuing to refer generally to FIGS. 1 through 36, a process 270 of manufacture 274 in one embodiment of a composite rail tie 100 in accordance with the invention is illustrated. In this process, core preparation 271 may be done as part of the process 270, or may already be completed prior to the process 270 beginning. The brackets indicate that this step is optional at this location, at this time, or at all.

Similarly, shell preparation 272 is extensive. All of the discussion hereinabove discusses at length various means and processes with all their accompanying equipment, procedures, materials, and so forth for preparation 272 of a shell 102. Thus, shell preparation 272 may include manufacture, inspection, storage, transporting, distribution, and so forth in order to acquire a shell 272 to be matched with a core 290 prepared 271 to form a central portion of the composite tie 100.

Core filling 273 involves placement of a core 290 inside a shell 102. Core filling 273 is a process of dealing with the realities of a conventional core 290. Typically, a composite structure may rely on a comparatively heavier, stronger, more continuous outer structure that supports the maximum stress loads at the "outermost fiber" as that term is used in the engineering arts.

Meanwhile, the center of such a rail tie 100 or composite tie 100 need not maintain the same mechanical properties, including density, structural strength, stiffness, elastic modulus, and so forth. Accordingly, the center of a tie 100 may be filled with a fill material 104 in the cavity 103, or a combination of materials constituting the total fill 104 in the cavity 103 of a shell 102.

It has been found that used, wooden, conventional, rail ties have certain benefits. They provide a cost effective portion of the fill 104 that will eventually fill the cavity 103 of a shell 102 forming a tie 100. They also may reduce weight substantially. Less importantly, they provide strength, stiffness, and toughness (as those terms are used in engineering parlance). Also, disposition by recycling may be simplified.

However, during the core preparation 271, observation of the core 290 will often show defects due to wear, weathering, impact, and so forth. Thus, a conventional railroad tie, such as the wooden railroad ties well known in the art will typically have flaws that are best treated by filling 273 with a resin. Core filling 273 involves filling the flaws in the outer surface of a conventional tie used as a core 290. Thus, core filling 273 may involve placing uncured resin in gaps or other inclusions within a core 290.

That resin may be partially cured or "B-staged" as known in the art. That is, the resin may be partially cured such that it becomes more-or-less dimensionally stable. It will no longer drip or pour. It will stay in place. Nevertheless, it is not being cured or completely cross linked to achieve its proper or maximum structural properties and strength.

Thus, core filling 273 may involve placing a liquid resin, placing and partially curing a resin to a stage B condition, or may involve filling and completely curing. After the filling 273 of a core 290 or the flaws within a core, it now has a dimensional stability that corresponds to a size suitable to fit inside a shell 102. Accordingly, assembly may now progress.

Assembly 274 includes placing the core 290 inside the shell 102. It may also require placement of spacers 260, depending on precision or subsequent stability required.

Once the assembly 274 is complete, then additional filling 275 (e.g., by resin) is possible. In the various embodiments of a process 270, the resin filling 275 may rely upon any of the processes described hereinabove in order to take up space, add additional fillers, weight reducers, foam, foaming (e.g., gassing) agents, glass or polymeric bubbles or beads, organic fillers or synthetics such as recycled crumb rubber, or the like. Thus, the process of resin filling 275 is directed principally at the process of filling the space that will exist between a shell 102 (as described hereinabove, in one of its embodiments) and a core 290 that will occupy the majority of the internal volume within the shell 102.

Molding 276 may take on various characteristics. For example, molding 276 may involve reliance on the shell 102 exclusively or non-exclusively as a mold cavity. It may include a spacer 298 spacing the core 290 appropriately within the shell 102. This may be so regardless of the cross section of the shell. Curing the resin 300 may be supported with no more mold than the shell 102 itself.

In other embodiments, an actual separate device called a mold 302, may receive the shell 102 with the core 290 and resin 300. In such a molding process 276 as this, the mold 302 may be used to maintain pressure, dimensional stability, add preloading, add heat, or otherwise stabilize or enable the process 270.

While in such a configuration, or thereafter, the resin 300 may ultimately be cured 277 by any appropriate means. This may be a chemical process using catalysis, ultraviolet (UV) curing, heat curing, or any other method of curing that is appropriate to the resin 300 occupying the space between the shell 102 and the core 290. It may occur with addition or removal of heat.

Testing 278 may involve testing for dimensional integrity, structural strength, porosity, proper curing and bonding of the resins 300, appearance, or the like. Testing 278 pronounces a product 100 adequate or inadequate by virtue of destructive testing 278 or nondestructive testing 278. Failure, an answer "no," results in the tie 100 being put to some other disposition.

Meanwhile, if testing 278 provides an answer of "yes" as to the suitability of the tie 100 for use, then coating 279 may occur as discussed hereinabove. Any surface on the outside of the tie 100 may be coated 279 as discussed at length hereinabove. A tie 100 may be inventoried 280 or put into inventory 280 for later distribution 281. Ultimately, the objective is installation 282 of a composite tie 100 in service.

Figure 34:
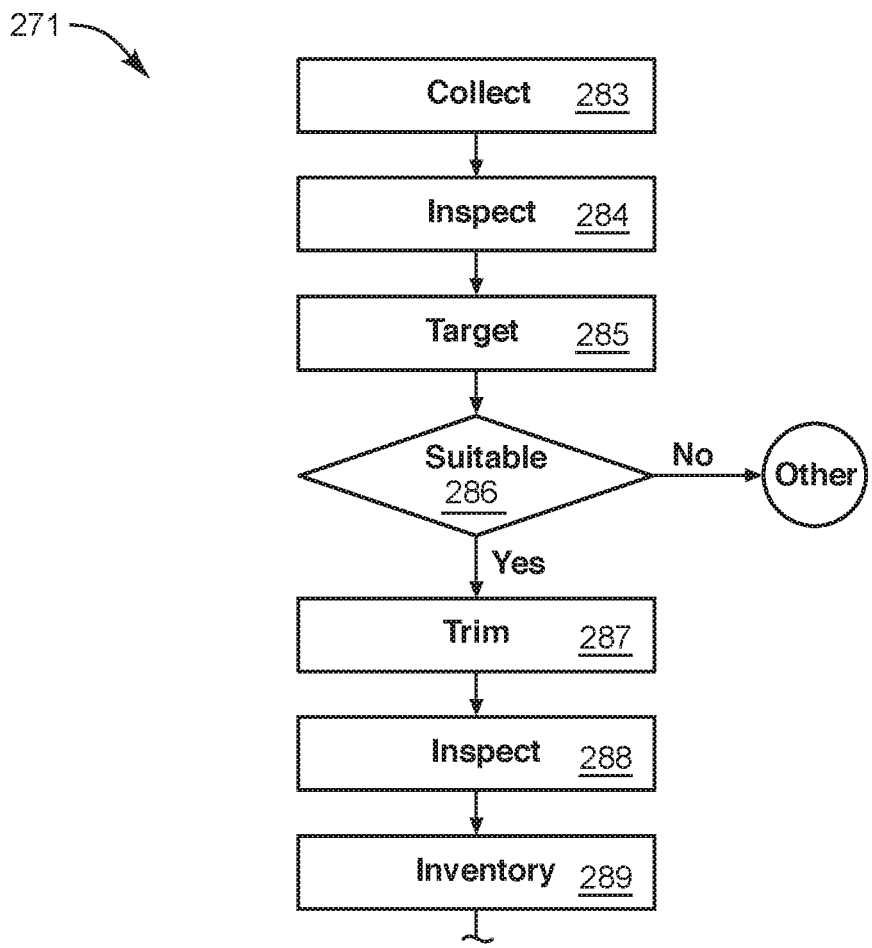
FIG. 34 is a schematic block diagram of a core preparation process that may be part of the process of FIG. 33, or may precede it.

Referring to FIG. 34, while continuing to refer principally to FIGS. 33 through 36, and generally to FIGS. 1 through 36, the core preparation process 271 may be a portion of the manufacturing process 270 or may precede it. Accordingly, one may collect 283 conventional, wooden, rail ties. These may be inspected 284. Suitable ones of those ties may be targeted 285 for use as cores 290 in rail ties 100 in accordance with the invention. Ultimately, a test 286 may be thought of as a sorting or classification whereby those that are not targeted result in a "no" answer to some other disposition thereof.

Meanwhile, those that pass the test 286 and may affirmatively be considered as useful in the cores 290 or as cores 290 in the ties 100 may move on to a trim process 287. The trim step 287 or process 287 may involve one or more steps or processes.

For example, the test 286 may include checking for the presence of residual metal, embedded pieces of metal, portions of spikes, or other metal embedded by any means for any reason or by accident. One reason for this test 286 is protecting woodworking machinery. High powered saws, planes, drills, and the like may be damaged or destroyed during high volume processing of used wood products, such as conventional railroad ties. Thus, part of the test 286 may be an inspection for residual metal. Testing 286 may include magnetic inspection, x-ray inspection, or anything else likely to detect the presence of hard materials that cannot be trimmed 287 or that may interfere with the process of trimming 287.

A conventional rail tie that passes the test 286 for use, may be trimmed 287 by sawing off its surfaces, planing thereof, grinding, sanding, blasting, or otherwise trimming 287 the tie.

Trimming 287 involves trimming for several functions. One function is to provide a dimensional value that is consistent for each one, within a specified tolerance. Thus, trimming 287 for sizing, shaping, or both purposes is one valuable use of trimming 287. Also, trimming 287 removes material that is on the outermost fiber or the outermost surface of the conventional rail tie. Thus, this is the wood that is typically dirty, splintered, crushed, chipped, split, nicked, and otherwise damaged. Trimming 287 trims off 287 the worst of the surface, while sizing the core 290 to an appropriate and standardized size and shape. This size will typically be from one quarter to one inch less in overall dimension of width 292 and thickness 293 or height 293 of the tie that becomes a core 290. It may be a greater reduction.

Inspection 288 may involve additional testing, and appropriate rejection of ties that will not be suitable for cores 290. Lack of integrity or stability for handling may be most important. Ultimately, all cores 290 that pass inspection 288 may be inventoried 289 for subsequent distribution and use.

Figure 35:
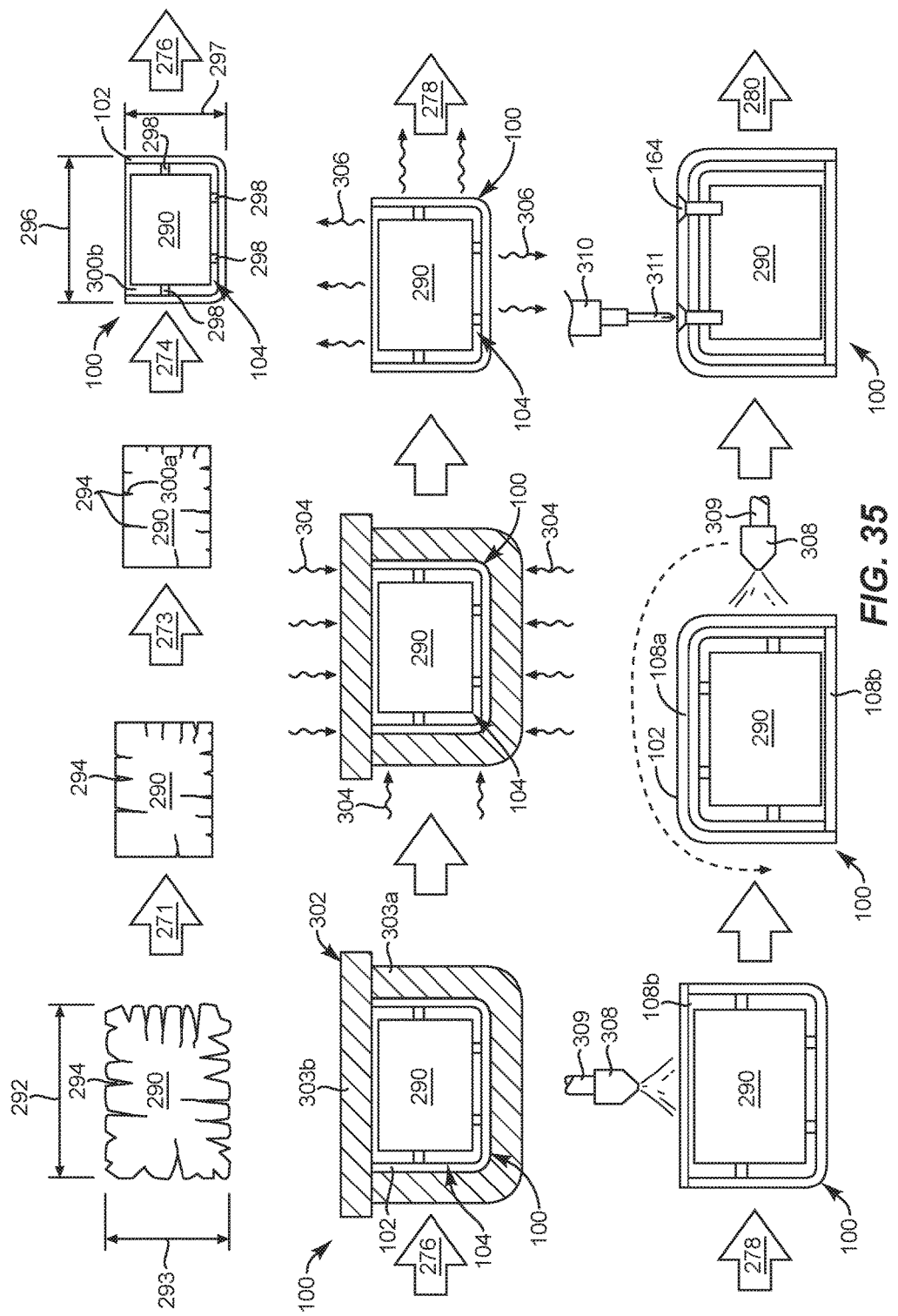
FIG. 35 is a process flow diagram illustrating various cross sectional views of a core and a composite rail tie in accordance with the invention.
Figure 36:
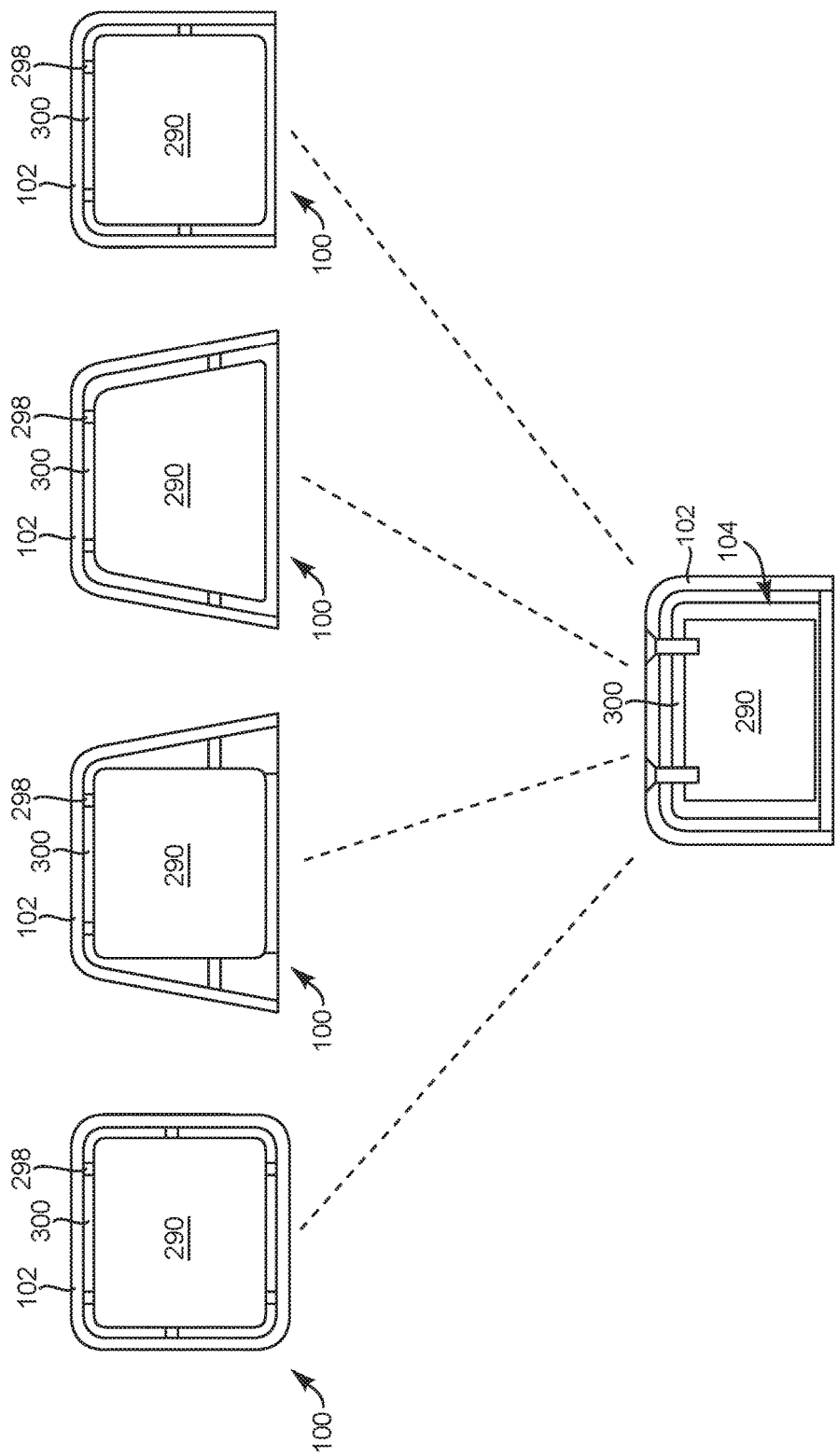
FIG. 36 is a series of cross sectional views of alternative embodiments of a composite rail tie filled with a portion of a conventional wooden tie as a core, which may take on any of the cross sections and use any of the fill materials around the core that have been discussed herein.

Referring to FIGS. 35 and 36, while continuing to refer generally to FIGS. 1 through 36, a process 270 is illustrated with the somewhat idealized versions of cross sections. Initially, one will note effectively ten frames or images in the process 270. Initially, a core 290 or more properly a core blank is typically constituted by a wooden, conventional, rail tie that is being recycled.

Thus, in the first frame or image, the width 292 and the height 293 are effectively the dimensions, along with a standard length, for a conventional rail tie. Necessarily, some amount of shrinkage may have occurred. Most significantly, however, may be the gaps 294. The gaps 294 may actually be splits 294, gouges 294, cracks 294, flaws 294, or the like. Typically, as wood weathers, particularly as it is subjected to sun for the drying it beyond its original new condition, as well as freezing and thawing cycles, stresses, and so forth may act to cause cracks 294, gaps 294, splits 294, or the like. Similarly, in directions other than a radial direction with respect to the axial center line of a core 290 may include chafing, compression, shearing, breakage, and other damage. These come as a result of the history of load bearing by the wooden rail tie 290 that becomes a core 290.

One valuable reason for reusing a worn, aged, damaged, rail tie 290 is the fact that such an article 290 must be disposed of. One effective way to dispose of that article 290 is to recycle it into another use. This may be considered repurposing. Repurposing here includes reusing it, not as an entirely foreign use, yet not as a rail tie 100, but as a core 290 that operates as a filler inside a composite rail tie 100.

In the illustrated embodiment, additional benefits accrue from the fact that a used rail tie 290 has a market value considerably less than the value of new, uncured resins 300. Thus, to the extent that rail ties 290 are available, they may provide a cost effective filler at the location where strength or stiffness are least required, near the center of a composite rail tie 100. Moreover, wood is lighter than or has a lower density than most resins.

In the second image, the core 290 has been trimmed 287 such that its width 292 and height 293 or thickness 293 are reduced. Those reductions may be equal or unequal. As a direct consequence, the portions of the gaps 294 closest to the outermost surfaces are necessarily removed. The step 270 between the first and second images may be characterized by a process 271 that results in a prepared core 290. That process 271 will typically involve cutting, planing, sanding, machining, sawing, or otherwise reducing the dimensions 292, 293 of the core 290. The effect includes reducing the influence and size of the gaps 294. Their outermost portions having been removed with material. Likewise, the dimensional stability and reliability, sometimes referred to as predictability, repeatability, variation, or tolerance has now come under the control of the process 271 of core preparation 271.

In one embodiment, the core filling process 273 or step 273 results in a core 290 in which the gaps 294 have all been substantially filled or prepared to be later filled with a resin 300*a*. Of course, the trailing letter on the reference numeral simply indicates a specific instance of the item identified by the reference number (e.g., 300). The result is the image number three or third image of the figure. Now the perimeter of the core 290 is filled in. The gaps 294 are filled with resin 300, which may be partially or fully cured. This fill step 273 may be done in the step 275, in the alternative.

Having now a properly shaped, filled, reinforced, or otherwise rehabilitated surface, and the like, the core 290 is ready for assembly 274. The fourth image illustrates the assembly 274 or assembled tie 100. In reality, the tie 100 is not complete, because the resin 300*b* filling in the gap 294 between the core 290 and the shell 102 into which it is placed has not been cured. Meanwhile, spacers 298 have been used or may typically be used to position the core 290 more precisely within the shell 102.

In certain embodiments, the resin 300*a* may be identical to the resin 300*b*. In other embodiments, the resins 300*a*, 300*b* may differ. As discussed hereinabove, the resin 300*a* filling in the gaps 294 may be "B-staged" or partially cured in order to stabilize it dimensionally, and render it a gel or a solid. A "B-staged" resin 300*a* or a wrapper thereon may permit ready handling of the core 290 in the filled condition, facilitating intermediate storage, inventory collection, or the like.

Ultimately, assembly 274 may or may not require the spacers 298. Typically, for precision, and maintaining tolerances otherwise, the width 292 and thickness 293 of the core 290 may provide a greater or lesser clearance between the core 290 and the shell 102. To the extent that the clearance or gap 294 between the core 290 and the shell 102 is within the tolerance of placement of the core 290 and the shell 102, then no spacer 298 need be required. The resin 300*b*, itself, may simply fill. In some instances it may form a very narrow (e.g., one quarter to one eighth inch) interface between the core 290 and the shell 102.

In other embodiments, the space 294 or gap 294 between the core 290 and the shell 102 may be substantial, even greater than half an inch or an inch. In such a situation, manufacturing tolerances may militate in favor of spacers 298 positioning the core 290 more precisely with respect to the walls 106 of the shell 102.

In this regard, one should also note that any cross section of shell 102 described hereinabove is a candidate for filling by a core 290. The spacers 298 may typically be bars 298, dots 298, rails 298, or long thin strips 298. In fact, the spacers 298 may be applied to the outer surfaces of the core 290 before it is placed into the shell 102 or onto the core 290. In other embodiments, the spacers 298 may simply be placed periodically as small monoliths of comparatively small dimension and aspect ratios of all dimensions that are on the order of one.

For example, small squares or circles of proper thickness may be placed near each end, or at certain distances along the length of a core 290, a shell 102, or a combination thereof. Thus, the spacers 298 may provide greater precision when wider gaps 294 are desired between the core 290 and the shell 102.

The fourth image thus leads to the resin filling 275 step. Resin filling 275 has been effectively done or is done, as in the fourth image after assembly 274 has placed the core 290, the spacers 298, and typically both into the shell 102, then resin 300b may be added into the gap 294 therebetween. However, in certain embodiments, particularly where the gap 294 between the core 290 and the shell 102 is comparatively small, such as on the order of about an eighth of an inch, resin 300b may actually coat the core 290 before the core 290 is placed into the shell 102. Resin 300 on the core 290 may fill the gap 294. Another reason this is a suitable manufacturing process is that the resin 300b may be selected to be expanding. It may expand by heat, a foaming agent, air injection, or other mechanisms. Thus, in certain embodiments, assembly 274 itself may involve placing a coated core 290 into the shell 102. All fitting or gap filling occurring later may rely on the coating 300a on the core 290. It may expand upon activation of itself, before or during ultimate cure of the resin 300b or itself.

The step 276 of molding 276 may or may not be required. Alternatively, one may think of the step 276 of molding 276 as having various embodiments. In the fifth image, an outer mold 302 is actually placed over the outermost dimensions 296, 297 of the tie 100. One reason for this is that good adhesion or chemical bonding may justify containment by a mold 302 having sufficient structural rigidity and stiffness to sustain necessary pressure and maintain the dimensions of width 296, and depth 297 (thickness 297) desired for the tie 100.

Nevertheless, depending on the pressures generated by the reactions and foaming of the resin 300b, molding 276 may or may not require containment by an actual mold 302. The top 303a may be required to maintain the thickness 297. Thus, the base 303a containing the tie 100 and the cap 303b or top 303b enclosing it may or may not be required.

Typically, where the shell 102 may be configured as a channel, the base 303a and top 303b secured together may provide better dimensional stability on the open side of the shell 102. For example, a foaming agent within the resin 300b may actually force some of the resin 300b out of the tie 100, or out from the gaps 294 between the core 290 and the shell 102.

Regardless of whether the molding process 276 requires or uses a mold 302, the curing step 277 is represented by the sixth image illustrating as an example. The heating 304 or addition of heat 304 to the tie 100 depends on reactants. Curing may or may not involve the addition of heat. For example, many types of resin 300 may be cured by catalysis, the natural reaction of mixed resin and hardener, such as an epoxies, or the like. Thermoforming relies on cooling of a melted resin (plastic). Thus, heat 304 is simply used here by example, and not as a requirement.

In that respect, with respect to image seven, the heat 306 leaving the tie 100 during and after cure need not correspond to the heating 304 that may be used for a cure. For example, thermoplastics may be melted in order to conduct the resin filling step 275. Epoxies and the like may be added, as most "thermosets," as room temperature liquids. Epoxies, in particular, typically create exothermic reactions between a resin and a hardener. Thus, the heat 306 exiting during and after cure may simply be the thermal rejection 306 required in order to dissipate the heat of reaction.

Testing 278 may be conducted to assure dimensional suitability, structural integrity, and the like as discussed hereinabove. Ultimately, following testing 278, a tie 100 as illustrated in the eighth image may now undergo spraying 279 or other coating 279 processes. These may involve spraying 279 by a nozzle 308, or any other applicator 308, from a paintbrush 308, to a dip 308, or the like.

Some supply 309 or line 309 may feed an applicator 308 applying a coating 108. Again, the coating 108 may be total, single sided, or the like. For example, in the illustrated embodiment, having a channel-shaped shell 102, the tie 100 may first be coated with the coating 108b on the open side of the tie 100, or that side of the tie 100 that is not covered by the shell 102. Again, various rationales for the coatings 108b have been discussed hereinabove. Likewise, the benefits and burdens of various coatings 108. Here, the coating process 279 or step 279 is illustrated by the eighth and ninth images. The tie 100 may be rotated, moved, or otherwise rendered accessible to an applicator 308 in order to supply the coating 108a on other surfaces of the shell 102.

Ultimately, the tie 100 may be inventoried 280 before or after the process of drilling illustrated in the tenth image. Also, for example, ties may be inventoried before or after coating 279. Ultimately, the destination of a tie 100 may dictate its condition in order to be suitable for its ultimate application.

For example, a standard tie 100 may be manufactured and later drilled by a suitable drill 310 and bit 311 to form apertures 164 set at the widths or spacing necessary. Conventional railroads run at a certain gauge width. Narrow gauge railroads, mining railroads, light rail mass transit, and freight rails may each have their own requirements that change the size of the rail, the spacing thereof, and the spacing apart of the apertures 164 as a direct result.

The resins 300 used may be of any suitable type for the functional requirements of strength, adhesion, durability, flexibility, loading, and so forth. In initial prototypes and analyses, it has been determined that an epoxy resin, such as the M1034 resin of Pro-Set® along with the M2037 hardener provide expanding epoxy foam that has been deemed suitable for the resin 300.

In particular, the resin 300b may be used, to the exclusion of a resin 300a, by conducting all of the core filling 273 and the resin filling 275 in a single step, such as in the assembled configuration of the fourth image of FIG. 35. However, the resin 300a may completely fill the gap 294 instead. Meanwhile, the discussion hereinabove regarding the use of hollow glass beads, polymeric beads, bubbles, or the like as fillers within any resin 300 also apply.

Referring to FIG. 36, while continuing to refer generally to FIGS. 1 through 36, as has been stated hereinabove, every permutation in combination cannot be illustrated. However, as discussed hereinabove, most of the options can be used with most of the other options. For example, a specific cross section, and the determination of whether that cross section will be open or closed for any specific shell 102 need not control the use of a core 290.

The processes 270, 271 merely need to accommodate that change in configuration. For example, if the shell 102 is configured as an open channel, whether rectangular, trapezoidal, or the like, it may receive a core 290 that is of a different shape, or a corresponding shape. Thus, FIG. 36 illustrates various embodiments wherein the core 290 may be of the same or congruent shape or a different shape compared to the cross sectional interior of a shell 102. In this regard, a core 290, after core preparation 271, may be laid into the tray or channel that is a shell 102.

In the case of a shell 102 that is closed on all sides, a core 290 may be passed axially (perpendicular to the cross sectional area) into the cavity 103 of a shell 102. This will also affect how, at what pressures, and over what times, any resin 300 will be positioned in the gap 294 between the core 290 and the shell 102. Again, the viscosity, the amount of fill material within the resin 300, "inner fills," and the like may all be accommodated by the engineering of the assembly step 274 and the resin filling steps 273, 275. Again, the core filling step 273 may be combined with the resin filling step 275 after assembly 274 of the core 290 in the shell 102 in certain embodiments.

Ultimately, the core 290 actually provides considerable structural stiffness, structural strength, and the like. It does so at a very favorable economic value. The recycling of a tie 290 as a core 290 greatly reduces, by up to a greater than ninety percent the amount of resin 300 required as the fill 104 in the cavity 103 of a shell 102. This can be done with no loss in structural integrity, strength, or stiffness.

Moreover, the effective density, weight, specific gravity, or the like of the tie 100 need not be adversely affected by the density of the core 290. Whereas many resins 300 are substantially heavier (more dense) than wood, they thereby increase the overall weight and thus handling requirements of a tie 100. The core 290 in the illustrated embodiments provides a normalization or reduction of the average weight of a tie 100 made in accordance with an embodiment of a process 270 in accordance with the invention.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus comprising:
    a shell comprising a matrix reinforced by a reinforcement constituted as fiber;
    a first fill comprising a solid acting as a structural material and being selected from wood, concrete, lightweight concrete, polymer, filled polymer, composite polymer, expanded polymer, and a combination thereof;
    a second fill formed within the first fill, having a shear strength greater than the shear strength of the first fill, and being secured to the first fill by at least one of a mechanical interference, an undercut, a chemical bond, and a mechanical texture bond;
    the first fill, having a density less than that of the matrix; and
    a fastener providing compression against the shell in response to engagement of the fill by the fastener.

2. The apparatus of claim 1, wherein at least a portion of the shell is glass-fiber-reinforced and the matrix is a polymer.

3. The apparatus of claim 2, wherein the glass fiber is configured as a mat.

4. The apparatus of claim 3, wherein the mat is selected from a non-woven, continuous-fiber mat and a woven, multi-axial-orientation, fiber mat.

5. The apparatus of claim 1, wherein the apparatus has a top side, wherein the fiber is spaced apart into at least two layers spaced apart to increase the section modulus thereof.

6. The apparatus of claim 4, wherein the fiber comprises at least one of glass and metal.

7. The apparatus of claim 1, wherein gaps in the first fill are selected from expanded polymeric particles and glass-filled glass particles reducing the density of the first fill.

8. The apparatus of claim 1, wherein the first fill comprises a constituent of reduced density selected from expanded elastomeric polymers and expanded non-elastomeric polymers, at ambient temperatures.

9. The apparatus of claim 1, wherein the fastener is selected from a spike, a screw, a lag screw, a rivet, a barbed spike, a spreadable spike, a spreadable screw, and a bonded fastener effective to collapse a portion of the solid.

10. A method of forming a rail tie comprising:
    forming a shell comprising a matrix reinforced by fiber, the shell including at least three contiguous, continuous, and substantially homogeneously formed walls;
    filling the shell with a fill formed of a material comprising a solid and a distribution of gaps comprising a quantity of microspheres containing a gas and mixed into a fill polymer, the fill being selected to resist deformation of the shell when subjected to an operating load;
    forming penetrations through the shell;
    positioning fasteners through the penetrations;
    securing a compressive load against an outer surface of the shell in response to a tensile load in the fastener maintained by the fill on the fastener.

11. The method of claim 10, wherein the fiber comprises glass, and the matrix comprises a polymeric resin cured to a solid state.

12. The method of claim 11, wherein the at least three walls include a top wall formed to have at least two layers of the fiber spaced apart from one another a distance selected to increase the section modulus of the top wall in bending.

13. The method of claim 12, wherein the fiber is selected from a continuous fiber mat, a woven, multi-axial-oriented, fiber mat, single-orientation rovings, and a combination of more than one thereof.

14. The method of claim 13, further comprising:
    providing a die representing an open cross section;
    introducing fiber reinforcement through the die in a pultrusion process;
    introducing a polymer resin into the pultrusion process;
    curing the polymer resin; and
    drawing the tie by a mechanical tension from the pultrusion process as a solid object.

15. The method of claim 14, further comprising:
    Providing the cross-section of the shell to include the at least two layers of the fiber and a substantially weaker spacer material therebetween;

providing an aperture through a wall of the shell;

providing a second aperture in the fill, the second aperture providing a continuous passage from outside the shell into the fill, through the first aperture; and securing the fastener against removal from the fill.

16. The method of claim 10, further comprising forming the fill to contain a matrix of structural material mixed together with the microspheres to reduce the weight of the fill.

17. An apparatus configured as a rail tie system comprising:

a shell formed as a pultruded, polymeric solid reinforced with fiber, the outer dimensions of the shell having an envelope defining an axial length, a lateral dimension orthogonal to the axial length, and a transverse dimension orthogonal to the axial dimension and the lateral dimension;

fill, in the shell between the maximum lateral direction and maximum transverse dimension, occupying substantially all locations not occupied by the shell;

the fill, further comprising microspheres included therewithin to constitute a fraction thereof effective to support the shell against structural failure, and receive a fastener therein effective to secure a rail to the apparatus, while reducing the weight thereof to provide a weight comparable to conventional ties for handling thereof; and the fill and fastener being mutually configured to provide permanent engagement therebetween resisting removal of the fastener from the fill.

\* \* \* \* \*